United States Patent [19]

Kawakita et al.

[11] Patent Number: 5,541,506
[45] Date of Patent: Jul. 30, 1996

[54] ROTATIONAL POSITION DETECTOR HAVING INITIAL SETTING FUNCTION

[75] Inventors: Haruo Kawakita, Okazaki; Takamoto Watanabe, Nagoya, both of Japan

[73] Assignee: Nippondenso Co., Ltd., Kariya, Japan

[21] Appl. No.: 142,092

[22] Filed: Oct. 28, 1993

[51] Int. Cl.$^6$ .............................. G01B 7/30; G01R 33/06; G01D 5/245
[52] U.S. Cl. .................... 324/207.2; 324/207.25; 324/174; 338/324; 327/511
[58] Field of Search ..................... 324/166, 173, 324/174, 207.2, 207.21, 207.25, 207.26, 225, 251, 252, 117 H, 175; 338/32 H, 32 R; 307/309, 278, 358, 494; 340/551, 670–672

[56] References Cited

FOREIGN PATENT DOCUMENTS 3220414 9/1991 Japan .
4353765 12/1992 Japan .

*Primary Examiner*—Sandra L. O'Shea
*Assistant Examiner*—Jay M. Patidar
*Attorney, Agent, or Firm*—Cushman, Darby & Cushman

[57] ABSTRACT

A rotational position detecting sensor such as a cylinder discriminating sensor, which is capable of detecting the rotational position of a rotor from immediately after the rotor starts to rotate as at an engine start, arranged such that when used as a cylinder discriminating sensor using a rotor for cylinder discrimination having a tooth formed around a semicircular portion thereof and a groove formed around another semicircular portion thereof, at an engine start, a binary output DO is set forcedly regardless of the positional relation between the rotor and the pick-up means, and then, if a difference Sn=Di−Dr as a result of comparison between the magnetic output Di resulting from rotation of the rotor and a reference value Dr is equal to and larger than 0, the difference most significant bit signal Sn(MSB) is set to "0", or if the difference Sn is less than 0, the Sn(MSB) is set to "1", and if the difference signal Sn is larger than a hysteresis width HYS, the binary output DO is set again, and when the signal is not inverted in the first setting again of this signal, a counter inverted signal −CT is output in a short artificial pulse, and if the signal is inverted, the binary output DO is output as the rotational position signal SO.

17 Claims, 28 Drawing Sheets

START FROM PROJECTED PORTION

START FROM RECESSED PORTION

FIG. 29A
PRIOR ART
START FROM PROJECTED PORTION
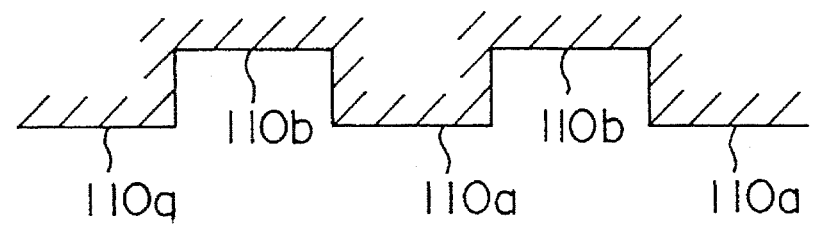
FIG. 29B
PRIOR ART
START FROM RECESSED PORTION
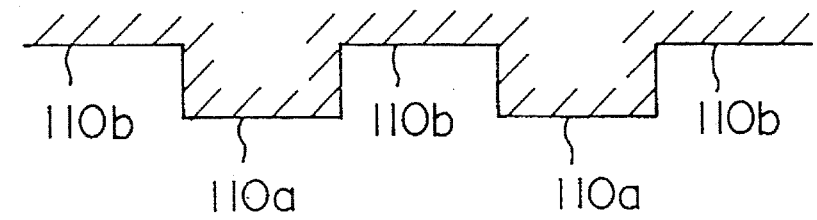
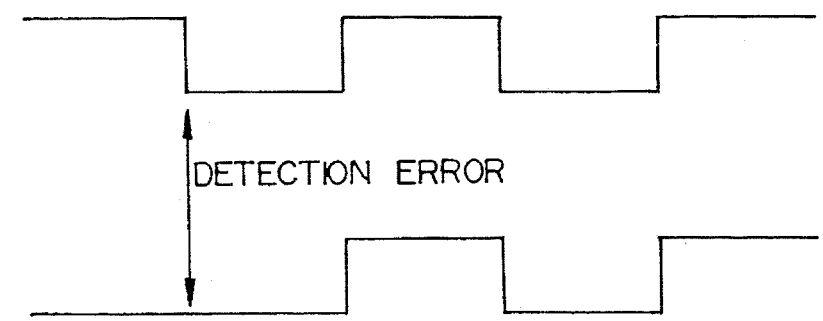

5,541,506

ROTATIONAL POSITION DETECTOR HAVING INITIAL SETTING FUNCTION

BACKGROUND OF THE INVENTION

1. Field of the Invention

This invention relates to apparatus including a magnetic variation pick-up means, disposed against a rotor having a tooth to be detected, for outputting a pulse signal which cyclically rises and falls as the tooth comes close to and leaves away from the pick-up means according to a signal from the pick-up means, and detecting the rotational position of the rotor according to the rising and the falling edges of the pulse signal.

2. Description of the Related Art

As shown in FIG. 26, there has been a known a rotating speed detecting apparatus (JP-A-3-220414) for detecting the number of automotive engine revolutions, including a magnet 120 for magnetic field biasing, disposed against magnetic-material teeth 110a of a rotor 110 rotating in synchronism with engine rotation, and a molded IC package enclosing a Hall element containing a magnetic variation detecting circuit 150 between the rotor 110 and the magnet 120. In FIG. 26, reference numeral 130 denotes a case made of a non-magnetic material, 141 denotes an input/output pin, 140 denotes a molded IC package and 142 denotes a wiring board.

The magnetic variation detecting circuit 150, from output of the Hall element, obtains a cyclic signal Di which becomes strongest when a tooth 110a of the rotor 110 is on the pick-up center line CL and becomes weakest when a groove 110b between the adjacent teeth is on the pick-up center line as shown in FIG. 27. This prior-art magnetic variation detecting circuit 150 successively detects points in time (indicated by upward arrows) where the cyclic signal Di has varied by a predetermined amount of hysteresis HYS from when the cyclic signal Di starts to increase, and outputs a low level signal "0", and also successively detects points in time (indicated by downward arrows) where the cyclic signal Di has varied by a predetermined amount of hysteresis HYS from when the cyclic signal Di starts to decrease, and outputs a high level signal "1". In other words, the magnetic variation detecting circuit outputs a rotational speed signal SO in a pulse form which is at the low level when a tooth 110a is located against the pick-up position and which is at the high level when a groove 110b is located against the pick-up position. This rotational position signal SO is input to a computer for automotive engine control and is used to calculate the rotating speed of the rotor 110, or the like.

The apparatus constructed as described can be applied to a cylinder discriminating sensor in the automotive engine, for example. In such an application, as shown in FIG. 28, a rotor 210 is used which has only a large projected tooth 210a with a central angle of 180° and a large groove 210b with a central angle of 180°.

However, in this prior-art magnetic variation detector circuit, the starting pulse form of the rotational position signal SO is determined once the cyclic signal Di has started to increase or decrease. Therefore, immediately after the engine is started, the rotational position signal SO has not yet been determined. What is referred to as immediately after the engine start is when the crankshaft is beginning to rotate by a starter, and also immediately after a power supply to a sensor is turned on. For this reason, immediately after the engine is started (immediately after the power is turned on), though the tooth 110a or 210a is located on the pick-up center line CL at the engine start (hereafter referred to as "start from a projected portion"), a high level signal is sometimes output as an initial value, and even though the groove 110b or 210b is located on the pick-up center line CL at the engine start (hereafter referred to as "start from a recessed portion"), a low level signal is sometimes output as an initial value. As a result, the conventional apparatus is sometimes unable to detect timing of the initial transition from a tooth to a groove or from a groove to a tooth just after the engine start.

In other words, at a start from a projected portion, as shown in FIG. 29A, though it is ideal to start with a low level signal, if the initial value of the SO signal is at the high level, the SO signal starts from the high level and continues to be at the high level until the tooth comes around. On the other hand, at a start from a recessed portion, as shown in FIG. 29B, though it is ideal to start from a high level, the SO signal sometimes starts from a low level and continues to be at the low level. In those cases, it is impossible to detect an initial timing of passage of an edge portion from a tooth 110a to a groove 110b or from a groove 110b to a tooth 110a.

Therefore, particularly in the cylinder discriminating sensor of a gasoline engine, the ignition timing in the first combustion stroke sometimes cannot be calculated, leaving high chances for the fuel/air mixture drawn into the cylinder not to be ignited and burnt, and exhausted into the atmospheric air.

SUMMARY OF THE INVENTION

It is therefore an object of the present invention to provide apparatus capable of detecting the rotational position of a rotor immediately after it starts rotating.

In order to achieve the above object, the apparatus for detecting the rotational position of a rotor according to the present invention comprises a rotor having a tooth to be detected; pick-up means, disposed in the vicinity of the rotor, for outputting a signal changing cyclically as the tooth comes closer thereto and leaves away therefrom by rotation of the rotor; change-over timing detecting means for detecting timing for the tooth to move from the state close to the state of leaving away from the pick-up means and timing for the tooth to shift from the moved-away state to the state of approaching the pick-up means according to the varying condition of the cyclically changing signal output by the pick-up means; pulse signal outputting means for outputting a pulse signal which cyclically changes between a first level corresponding to the state that the tooth is close to the pick-up means and a second level corresponding to the state that the tooth is moved away from the pick-up means according to a detection result by the change-over timing detecting means; and rotational position detecting means for detecting the rotational position of the rotor according to the change-over timing of the output levels of the pulse signal from the pulse signal outputting means, characterized in that there are provided forced setting means for forcedly setting a predetermined one level out of the first and the second levels as an initial value of the pulse signal outputting means when the rotor starts to rotate from the stationary state, that is, when the power supply is turned on; decision means for deciding whether or not the output level set forcedly is to be inverted according to an output signal of the first or the second level output by the pulse signal outputting means in response to the first change-over timing detection made by the change-over timing detecting means from the varying condition of the cyclic signal output by the pick-up means; and artificial change-over signal outputting means for outputting an artificial change-over signal artificially representing a change-over timing to the rotational position detecting means in response to detection of the first change-over timing when the decision means decides that the output level set forcedly is not inverted.

By the apparatus for detecting the rotational position of a rotor according to the present invention, while the rotor rotates, pick-up means outputs a signal which changes cyclically as the tooth comes closer to and leaves away from the pick-up means. The pulse signal outputting means outputs a pulse signal whose level changes at timing when the tooth detected changes from the state close to the pick-up means to the state of leaving away therefrom and at timing that the tooth detected changes from the state of being moved away from the pick-up means to the state of approaching it, said two kinds of timing being detected from the varying condition of the cyclically changing signal output by the pick-up means. The rotational position detecting means can detect the rotational position of the rotor according to this pulse signal.

When the rotor starts to rotate from the stationary state, the forced setting means sets as an initial value of an output level of the pulse signal setting means, for example, the output level in a stage that the tooth of the rotor is close to the pick-up means, regardless of the state in which the pulse signal should be when the rotor is stationary. This setting may agree or may not agree with the positional relation between the tooth of the rotor and the pick-up means. If this setting happens to agree with that positional relation, by the above-mentioned actions of the pick-up means, the change-over timing detecting means, and the pulse signal outputting means, the output level of the pulse signal is inverted from the timing that the positional relation between the tooth of the rotor and the pick-up means changes in the first place.

On the other hand, when the initial value set by the forced setting means does not agree with the positional relation between the tooth under detection of the rotor and the pick-up means, the decision means decides that the output level set by the forced setting means is not inverted even if the change-over timing detecting means detects a change-over timing, so that the artificial change-over signal outputting means outputs an artificial change-over signal to the rotational position detecting means.

Therefore, by the apparatus for detecting the rotational position of a rotor according to the present invention, even if the rotor starts to rotate with the tooth under detection located against the pick-up means, or at a position moved away from the pick-up means, it is possible to detect a change of the positional relation between the tooth under detection and the pick-up means from the beginning.

BRIEF DESCRIPTION OF THE DRAWINGS

FIGS. 29A and 29B are timing charts showing problems in the conventional rotational position detecting sensor.

DESCRIPTION OF THE PREFERRED EMBODIMENT

A preferred embodiment of the present invention will be described next.

Figure 1:
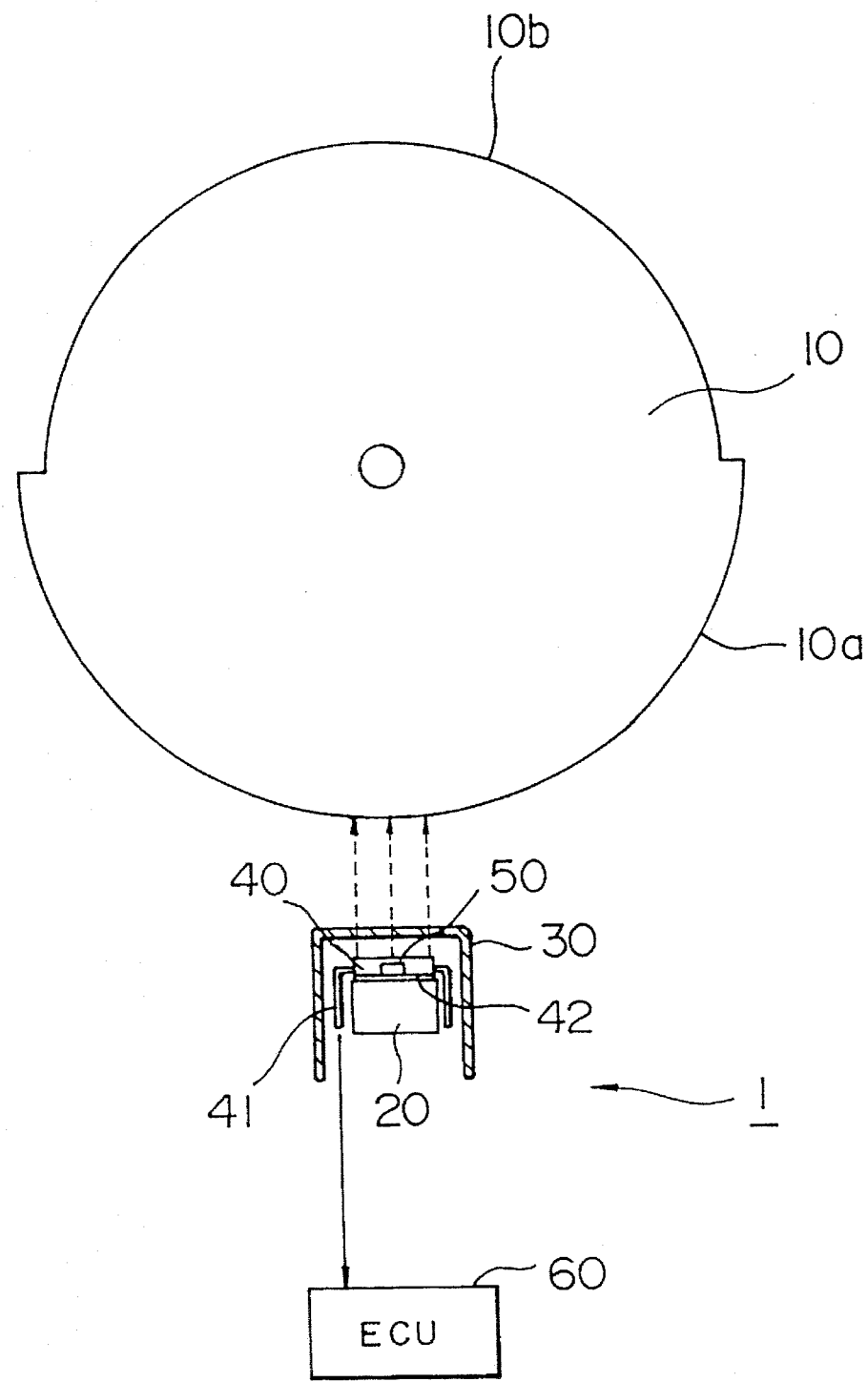
FIG. 1 is a schematic construction diagram of a cylinder discriminating sensor as an embodiment of the apparatus for detecting the rotational position of a rotor according to the present invention.

In this embodiment, the present invention is applied to a cylinder discriminating sensor 1 mounted on a 4-cylinder gasoline engine. The cylinder discriminating sensor 1 is made by placing a magnet 20 for magnetic field biasing against a rotor for cylinder discrimination having a tooth 10a formed around its semicircular portion and a groove 10b formed around its remaining semicircular portion as shown in FIG. 1, and arranging a molded IC package 40 enclosing a magnetic variation detecting circuit 50 containing a Hall element between the rotor 10 and the magnet 20. In FIG. 1, reference numeral 30 denotes a case made of non-magnetic material, 41 denotes an output pin, 42 denotes a wiring board, and 60 denotes an engine control computer unit (ECU) including a CPU, ROM, RAM, clock or the like.

Figure 2:
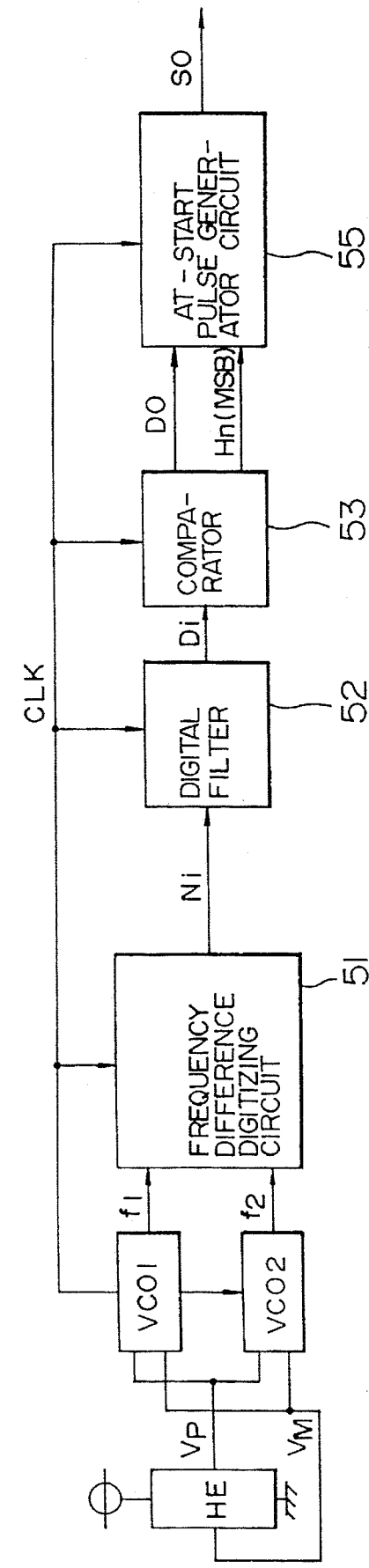
FIG. 2 is a construction diagram of a magnetic change detecting circuit 50 used in the cylinder discriminating sensor shown in FIG. 1.

As shown in FIG. 2, the magnetic variation detector 50 comprises, for example, a first voltage-to-frequency converter circuit VCO1 formed by a CMOS type voltage controlled oscillator and a second voltage-to-frequency converter circuit VCO2 formed similarly by a CMOS type voltage controlled oscillator connected in parallel and is constructed such that Hall voltages $V_p$ and $V_M$ from a Hall element HE are applied to the voltage-to-frequency converter circuits VCO1 and VCO2. The voltage-to-frequency converter circuits VCO1 and VCO2 respectively produce oscillation outputs of different frequencies f1 and f2 according to the variations of Hall voltages $V_p$ and $V_M$ from the Hall element HE. The oscillation outputs of the frequencies f1 and f2 are input to a frequency difference digitizing circuit 51. The frequency difference digitizing circuit 51 supplies a numeric output signal Ni numerically representing a difference f1–f2 between the frequencies f1 and f2 to a digital filter 52 at the next stage. The digital filter 52 converts this numeric output signal Ni into a digital output signal Di, and supplies the digital output signal Di to a comparator 53 at the subsequent stage. The comparator 53 executes a binary digitization process on the digital output signal Di, and outputs a binary output signal DO and a most significant bit signal Hn(MSB) of a hysteresis signal Hn calculated in the comparator in conjunction with output of the binary output signal DO. The binary output DO and the hysteresis most significant bit signal Hn(MSB) are input to an at-start pulse generator circuit 55 at the subsequent stage. The at-start pulse generator 55 executes an arithmetic process on the binary output signal DO and the hysteresis most significant bit signal Hn(MSB), and outputs to the ECU 60 a rotational position signal SO in the form of a pulse signal which goes to the low level when a tooth 10a of the rotor 10 is placed against the pick-up position and goes to the high level when a groove 10b is placed against the pick-up position. ECU 60 can decide the rotational position of the rotor 10 according to a rising edge and a falling edge of the rotational position signal SO, and on the basis of this decision, calculate the ignition timing of each cylinder.

Figure 3:
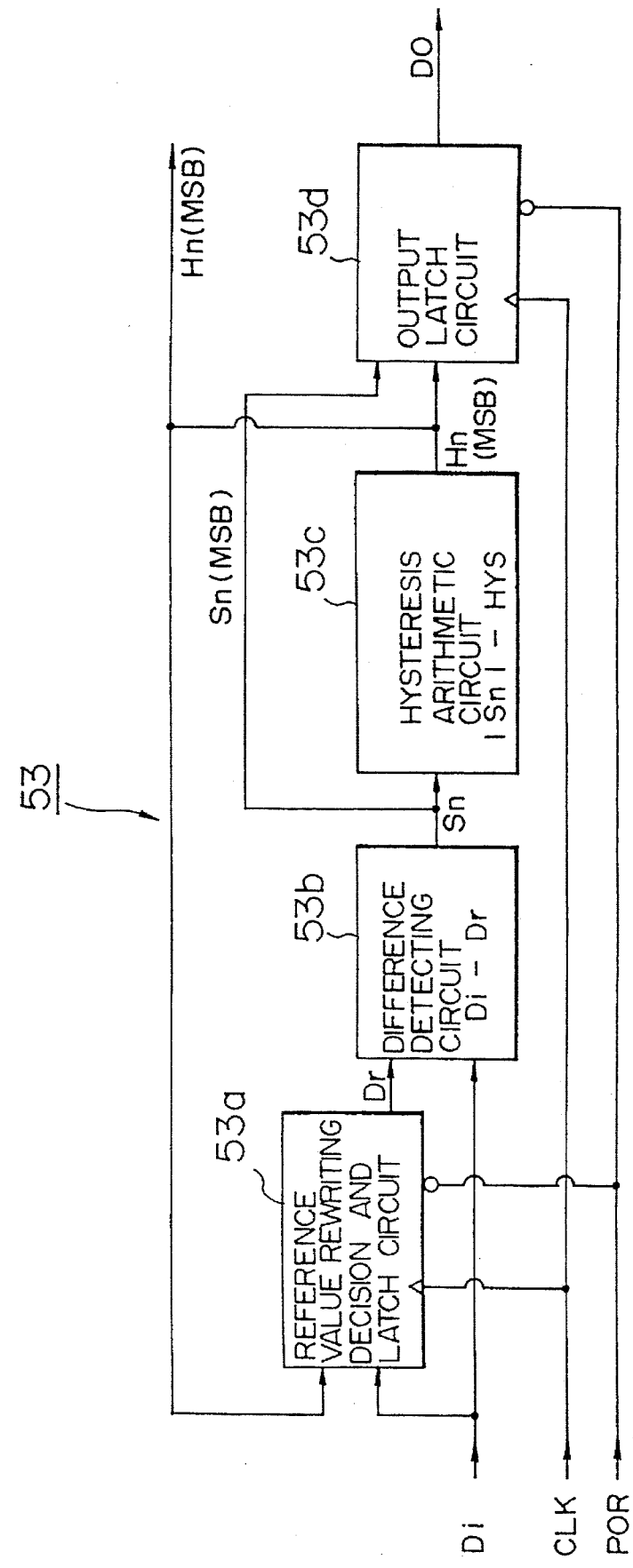
FIG. 3 is a detailed circuit configuration diagram of a comparator 53 in the magnetic change detecting circuit shown in FIG. 2.

The comparator 53 has a circuit configuration represented in detail in FIG. 3.

The comparator 53 comprises a reference value rewriting decision and latch circuit 53a for receiving a digital output signal Di from the digital filter 52 and outputting a predetermined reference value signal Dr, a difference detecting circuit 53b for receiving the reference value signal Dr and the digital output signal Di and outputting a difference signal Sn=Di–Dr and a difference most significant bit Sn(MSB) which is set to "0" or "1" depending on whether or not the difference signal is 0 or larger, a hysteresis arithmetic circuit 53c for calculating a hysteresis signal Hn=|Sn|–HYS obtained by subtracting a hysteresis width HYS from the difference signal Sn output by the difference detecting circuit 53b and outputting a hysteresis most significant bit signal Hn(MSB) which is set to "1" or "0" depending on whether or not the hysteresis signal Hn is larger than 0, and an output latch circuit 53d for receiving the hysteresis most significant bit Hn(MSB) and the difference most significant bit Sn(MSB) and outputting a binary output signal DO. A clock signal CLK is supplied to the reference value rewriting decision and latch circuit 53a and the output latch circuit 53d to cause those circuits to execute arithmetic processes at synchronized timing.

Figure 4:
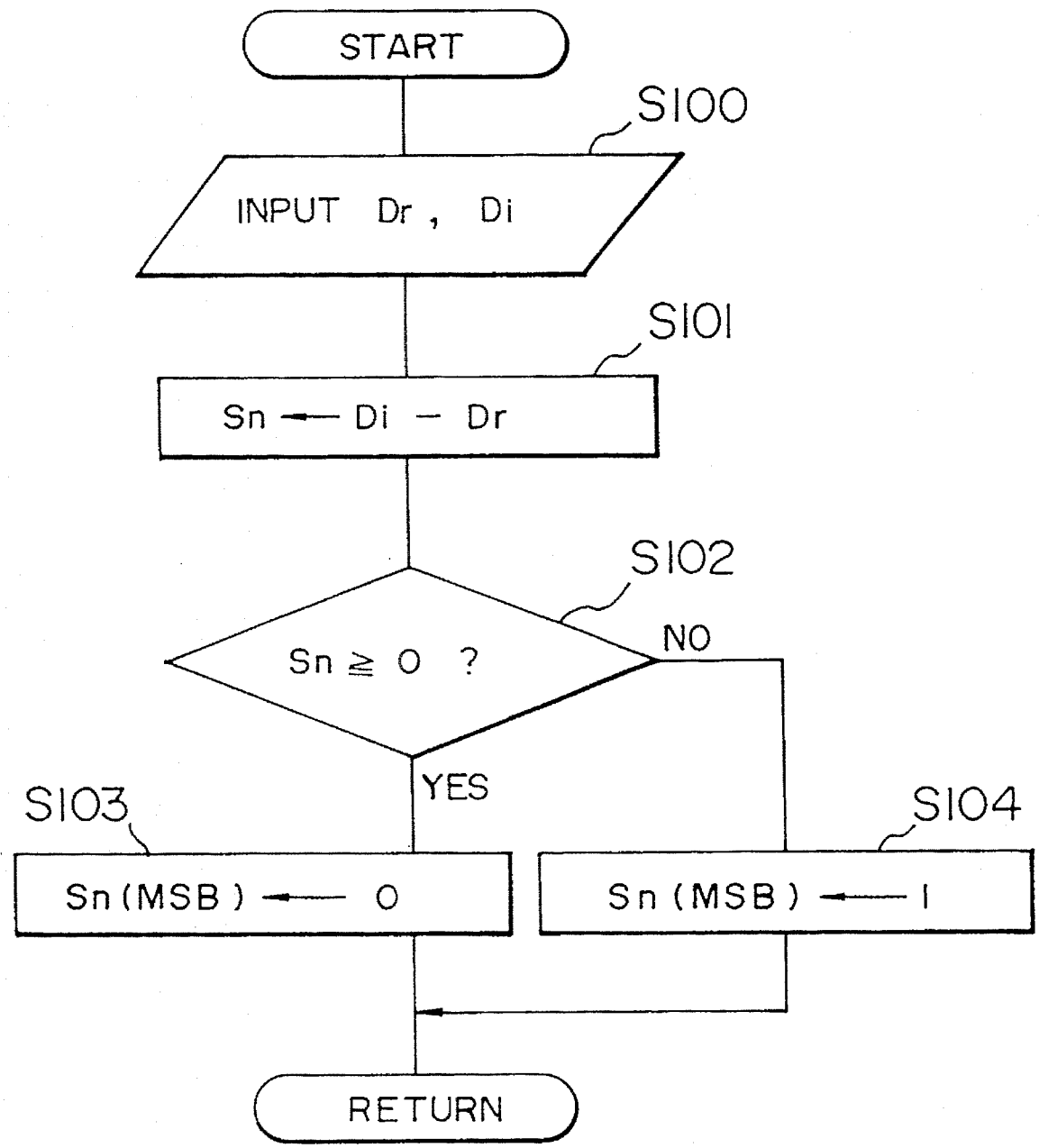
FIG. 4 is a flowchart of an algorithm executed by a difference detecting circuit 53b in the comparator shown in FIG. 3.

The difference detecting circuit 53b has a circuit configuration as shown in an algorithm in FIG. 4. In this algorithm, the difference detecting circuit 53b receives a reference value signal Dr and a digital output signal Di (S101), and calculates a difference signal Sn=Di–Dr (S101). The difference detecting circuit 53b decides whether or not the difference signal Sn is equal to or larger than 0. If the decision in S102 is "YES", that is, if a decision is made that the digital output signal Di is increasing, "0" is set for the most significant bit signal Sn(MSB) (S103). On the other hand, if the decision in S102 is "NO", that is, if a decision is made that the digital output signal Di is decreasing, "1" is set (S104).

Figure 5:
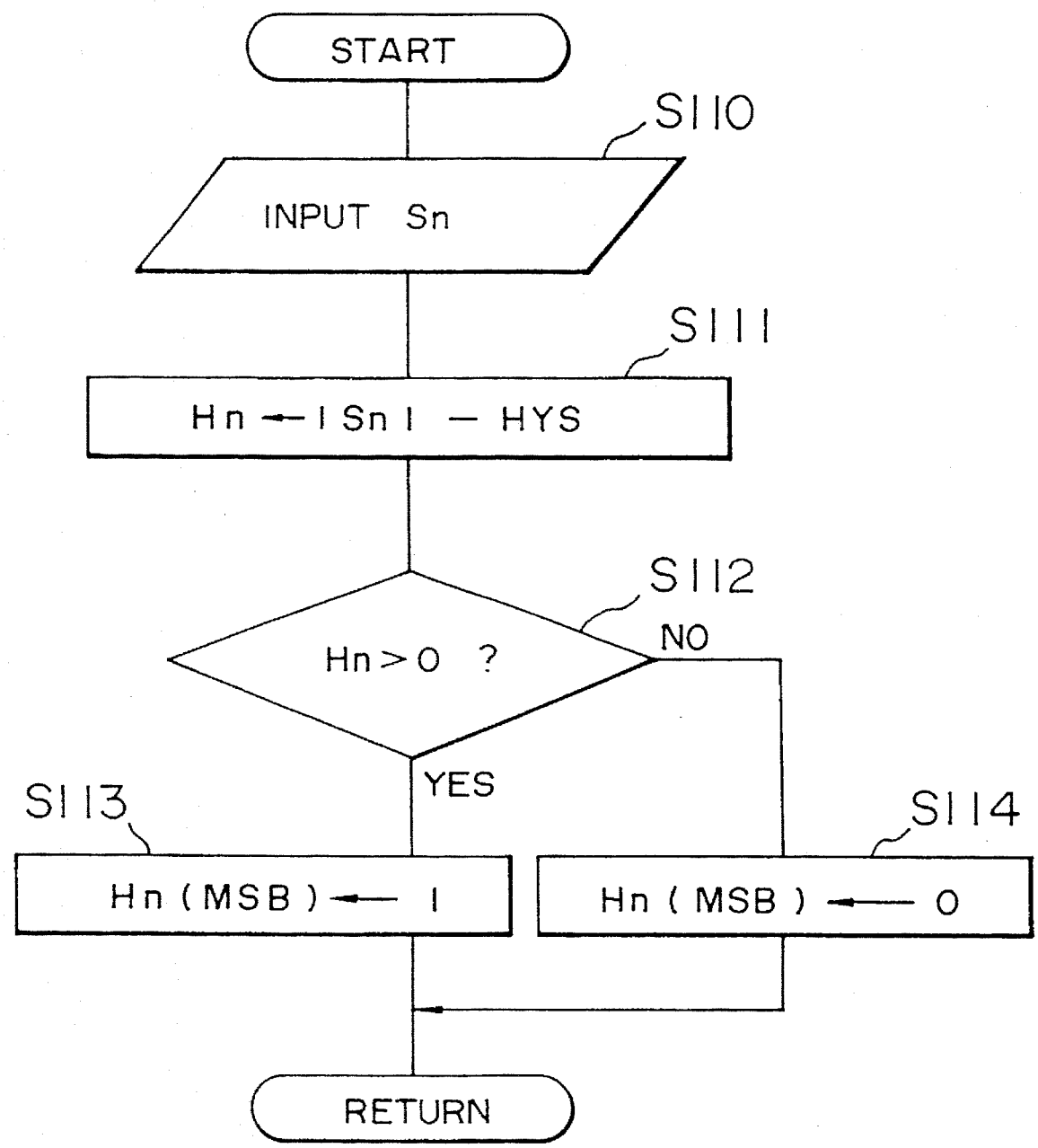
FIG. 5 is a flowchart of an algorithm executed by a hysteresis arithmetic circuit 53c in the comparator shown in FIG. 3.

The hysteresis arithmetic circuit 53c has a circuit configuration shown in an algorithm in FIG. 5. This algorithm proceeds as follows. A difference signal Sn is input (S110), and a hysteresis signal $Hn=|Sn|-HYS$ is calculated (S111). The HYS is a predetermined hysteresis width which is set in advance. This step S111 is followed by a step to decide whether or not the hysteresis signal Hn is larger than 0 (S112). If Hn>0, "1" is set for the most significant bit signal Hn(MSB) (S113), and if $Hn \leq 0$, "0" is set (S114).

Figure 6:
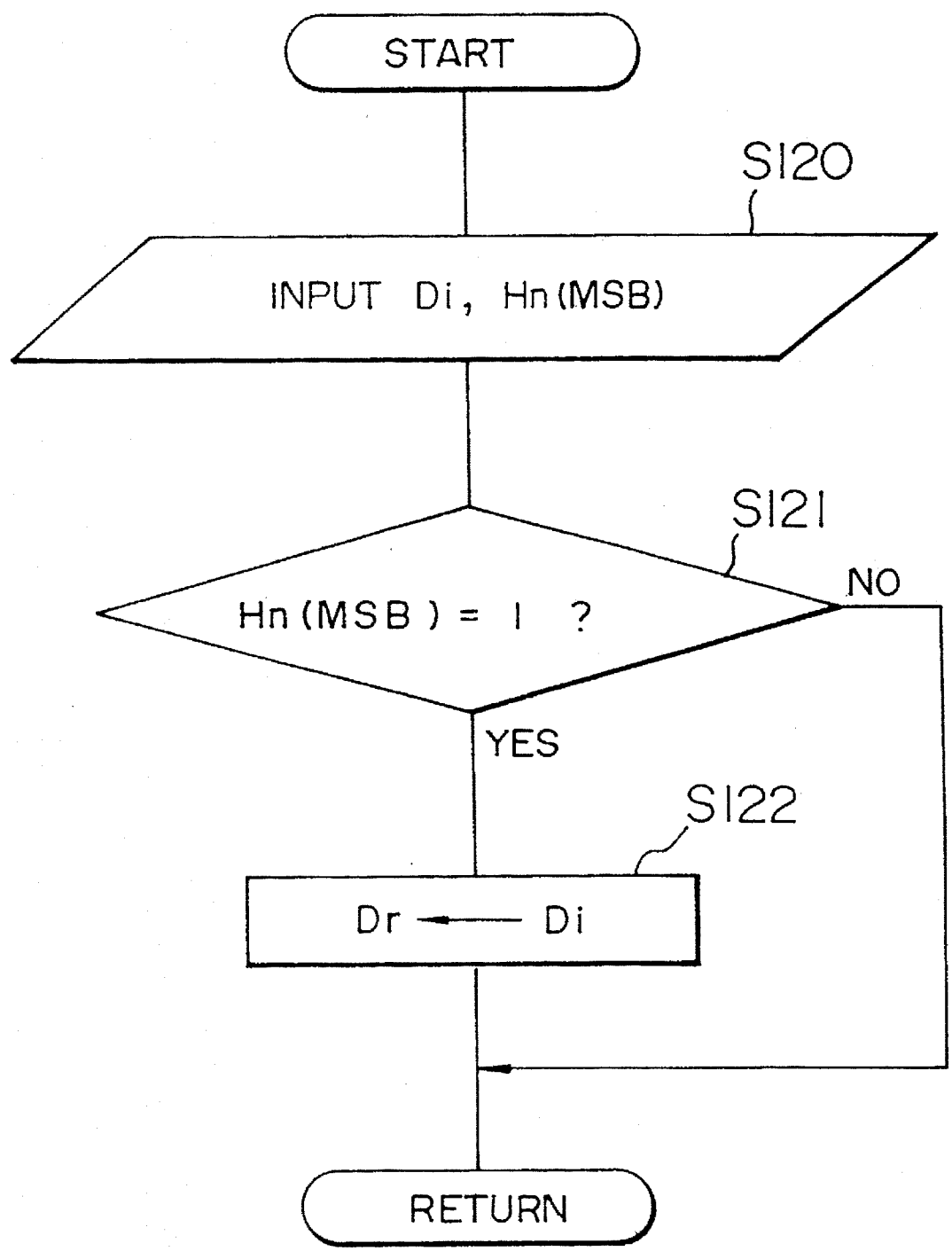
FIG. 6 is a flowchart of an algorithm executed by a reference value rewriting decision and latch circuit 53a in the comparator shown in FIG. 3.

The reference value rewriting decision and latch circuit 53a outputs as a reference value signal Dr a digital output signal Di which is latched by a predetermined latch timing. This latch timing is a time when the engine is started (the power supply is turned on) and a time when the above-mentioned most significant bit signal Hn(MSB) is "1". To fulfill this function, the reference value rewriting decision and latch circuit 53a has a circuit configuration shown in an algorithm in FIG. 6.

The reference value rewriting decision and latch circuit 53a is so constructed that a power reset signal POR is input thereto when the engine is started, and sets as the reference value signal Dr a digital output signal Di0 which is input thereto in synchronism with the first clock signal CLK from immediately after the reset is released, and outputs the Di0. This circuit 53a executes an arithmetic process by using the algorithm in FIG. 6 in synchronism with the clock signal CLK from the moment the engine is started and onwards. In this arithmetic process, the digital output signal Di and the hysteresis most significant bit signal Hn(MSB) are input (S120). Then, a decision is made whether or not the hysteresis most significant bit signal Hn(MSB) is "1" (S121). If the decision at S122 is "YES", the digital output signal Di input at S120 is set as the reference value signal Dr (S122). On the other hand, if the decision at S121 is "NO", the process is finished with the reference value signal remaining as it is.

Figure 7:
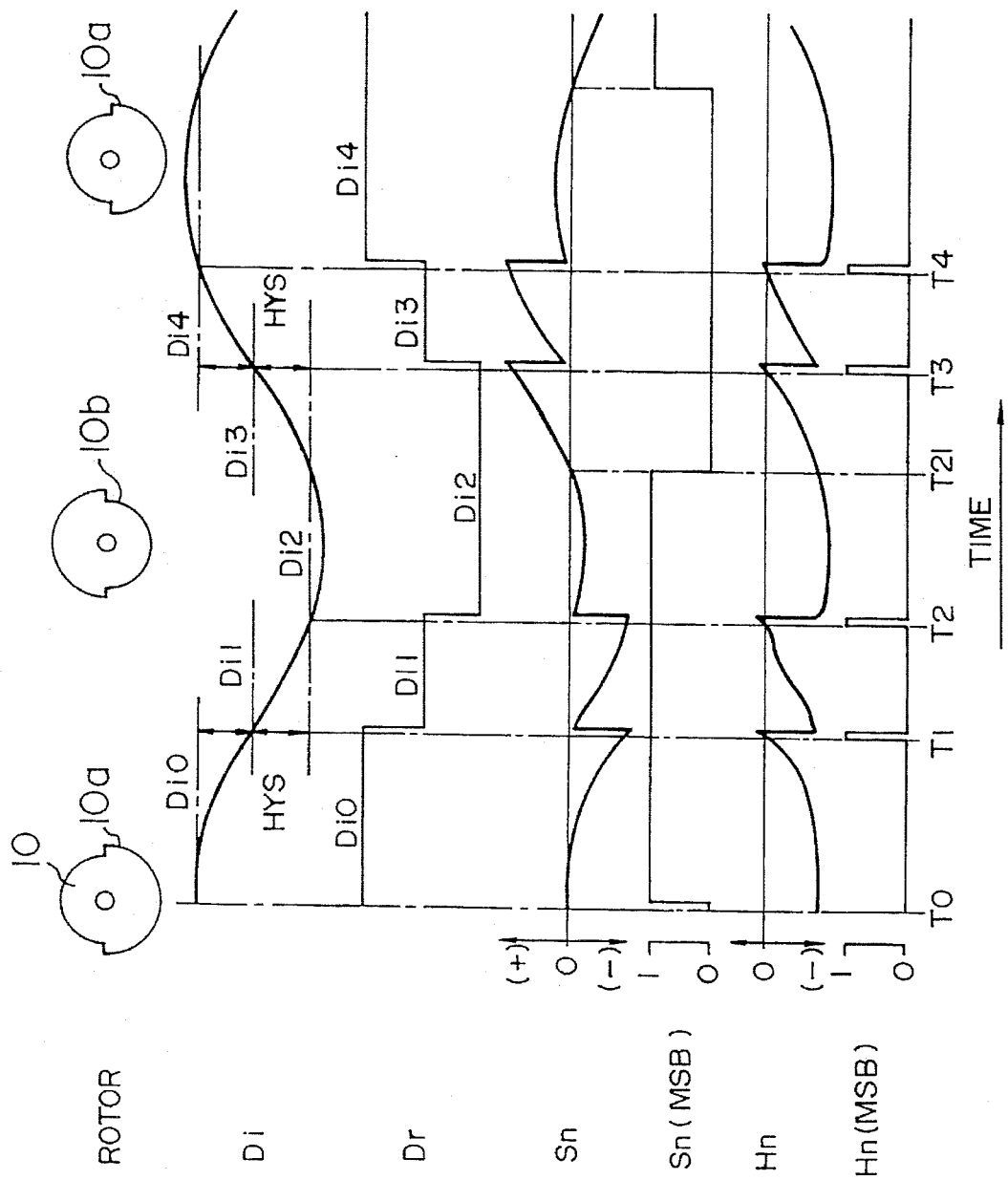
FIG. 7 is a timing chart showing the relation among signals including an output signal Di of a digital filter 52 in the magnetic change detecting circuit shown in FIG. 2 for a predetermined time period from immediately after the engine is started.

Taking as an example the case where a tooth 10a is placed against the pick-up position when the engine is started, FIG. 7 shows the relation among the digital output signal Di, the reference value signal Dr, the reference signal Sn, the difference most significant bit signal Sn(MSB), the hysteresis signal Hn, and the hysteresis most significant bit Hn(MSB) for a predetermined time period from immediately after the engine is started, In FIG. 7, to clarify how the digital output signal Di increases or decreases with the rotation of the rotor 10, the digital output signal Di is represented as if it varies in analog form. Also in other figures from FIG. 7 on, the digital output signal Di is illustrated as if it varies in analog form.

As shown in FIG. 7, at engine start time T0 (after POR is released), the digital output signal Di=Di0 is set as the reference value signal Dr, and therefore, the difference signal Sn=Di−Dr calculated in the difference detecting circuit 53b is "0". Accordingly, the hysteresis signal $Hn=|Sn|-HYS$ calculated in the hysteresis arithmetic circuit 53c is equal to or less than 0, and "0" is set for the hysteresis most significant bit signal Hn(MSB). At this time, "0" is temporarily assigned to the difference most significant bit signal Sn(MSB).

From immediately after time T0, the difference signal Sn begins to decrease, immediately causing the difference most significant bit signal Sn(MSB) to become "0". On the other hand, until time T1 when the hysteresis signal Hn exceeds 0 for the first time, the hysteresis most significant bit signal Hn(MSB) remains in the initial state of "0".

At time T1, since the hysteresis signal Hn exceeds 0, the step S113 in the algorithm of FIG. 5 is executed and the hysteresis most significant bit signal Hn(MSB) is set to "1". Therefore, the reference value rewriting decision and latch circuit 53a executes the step S123, in which the digital output signal Di1 at this time is set as the reference value signal Dr.

Immediately after time T1, the difference signal Sn returns to substantially 0 but again increases in absolute value in the negative region. The hysteresis signal Hn decreases almost to −HYS and then increases gradually. As a result, immediately after time T1, the hysteresis most significant bit signal Hn(MSB) returns to "0". At the time T1 the digital output signal Di is still showing a downward trend, so that the difference most significant bit signal Sn(MSB) remains at "1".

At time T2 when the hysteresis signal Hn exceeds 0, "1" is set for the hysteresis most significant bit signal Hn(MSB) and the digital output signal Di2 at this time is set as the reference value signal Dr. As a result, immediately after time T2, the difference signal Sn again returns to substantially 0 and the hysteresis signal Hn also decreases to close to −HYS. Therefore, the hysteresis most significant bit signal Hn(MSB) again returns to "0". From time T21 after time T2, the digital output signal Di bounces back to an increasing trend, so that the difference signal Sn increases to higher than 0. For this reason, the difference most significant bit signal Sn(MSB) falls to "0".

At time T4 when the hysteresis signal Hn exceeds 0, "1" is again set as the hysteresis most significant bit signal Hn(MSB), and the digital output signal Di4 at this time is set as the reference value signal Dr. At time T4, the digital output signal Di is still on the upward trend, the difference most significant signal Sn(MSB) remains at "0". The digital output signal Di, the reference value signal Dr, the difference signal Sn, the difference most significant bit signal Sn(MSB), the hysteresis signal Hn, and the hysteresis most significant bit signal Hn(MSB) go on varying in the manner already described.

Figure 8:
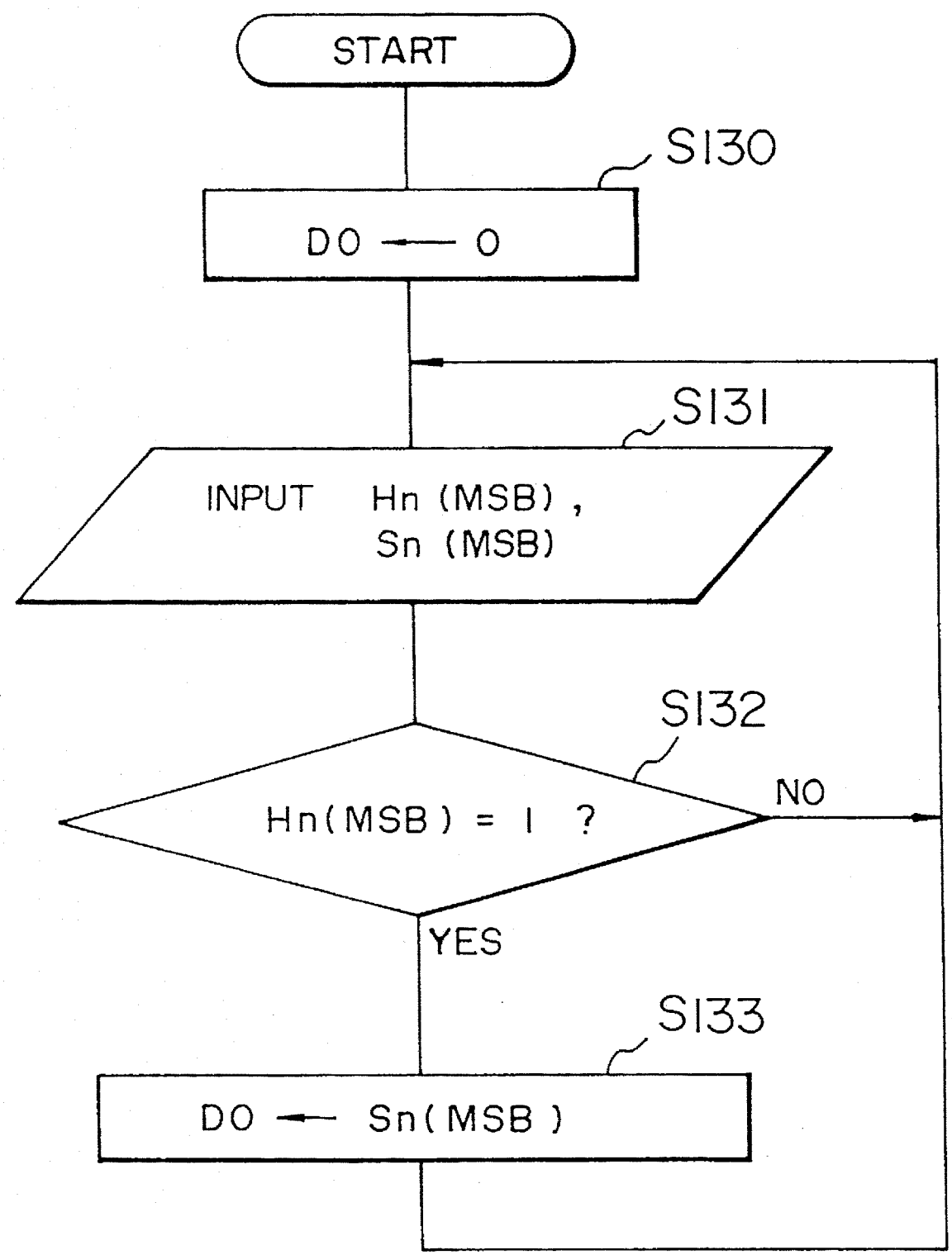
FIG. 8 is a flowchart of an algorithm executed by an output latch circuit 53d in the comparator shown in FIG. 3.

The output latch circuit 53d is so arranged as to receive a power on reset signal POR at the reset terminal thereof when the engine is started as shown in FIG. 3. When this power on reset signal POR is applied, the output latch circuit 53d is initialized so as to output "0" as the binary output signal DO. For a period since the power on reset signal POR is applied until "1" is input as the hysteresis most significant bit signal Hn(MSB), the binary output signal DO does not change and remains at "0". When "1" is input as the hysteresis most significant bit signal Hn(MSB), the difference most significant bit signal Sn(MSB) being currently input is set as the binary output signal DO, and remains being output until Hn(MSB)=1 is input again after the Sn(MSB) changes its level. More specifically, as shown in FIG. 8, the output latch circuit 53d forcedly sets "0" as the binary output signal DO when the engine is started (S130), receives the hysteresis most significant bit signal Hn(MSB) and the difference most significant bit signal Sn(MSB) (S131), decides whether or not the hysteresis most significant bit signal Hn(MSB) is "1" (S132), and if the decision is "YES", the difference most significant bit signal Sn(MSB) being currently input is set again as the binary output signal DO (S133), or if the decision is "NO", the above-mentioned setting again is not performed and the steps from S131 on are repeated.

Figure 9A:
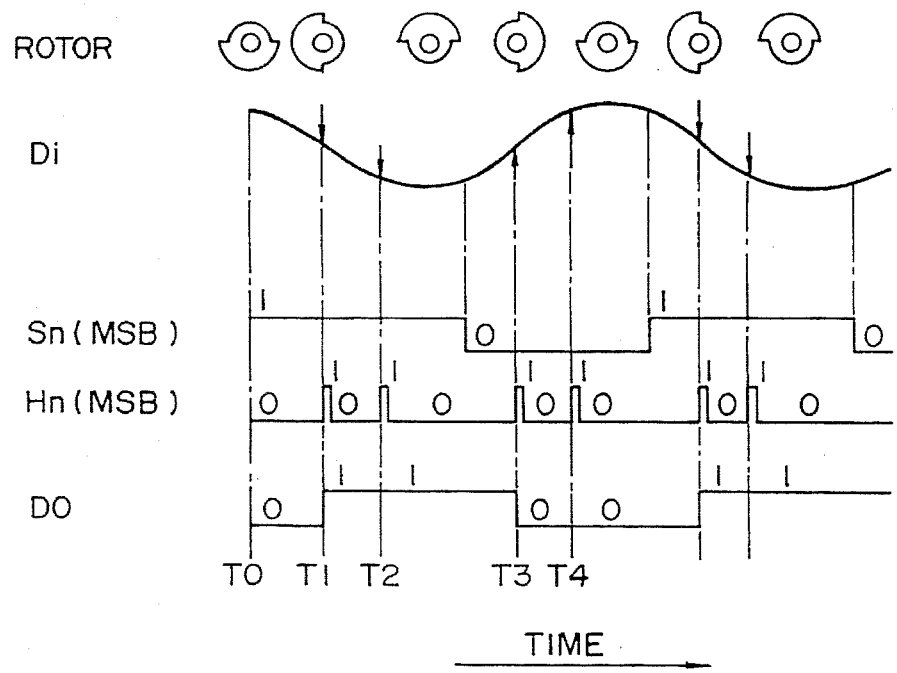
FIGS. 9A and 9B are timing charts showing the relation among a difference most significant bit signal Sn(MSB) as the output signal of the difference detecting circuit 53b, a hysteresis most significant bit signal Hn(MSB) as the output signal of the hysteresis arithmetic circuit 53c, and a binary output signal DO as the output signal of the output latch circuit 53d all in the comparator shown in FIG. 3 for a predetermined time period from immediately after the engine is started.

Since the output latch circuit 53d is constructed as described, in a predetermined time period from immediately after the engine is started under the conditions corresponding to those in FIG. 7 (hereafter referred to as a start from a projected portion), the relation among the difference most significant bit signal Sn(MSB), the hysteresis most significant bit signal Hn(MSB) and the binary output signal DO is as shown in FIG. 9A. To be more specific, if the tooth 10a of the rotor 10 is located against the pick-up position when the engine is started, as shown in FIG. 9A, at time T0, the binary output signal DO starts with "0", then at time T1, goes to "1" and stays at "1" until time T3, and at time T3, falls again to "0". In FIG. 9A, the arrows attached to the Di curve indicate hysteresis-exceeding points.

Figure 9B:
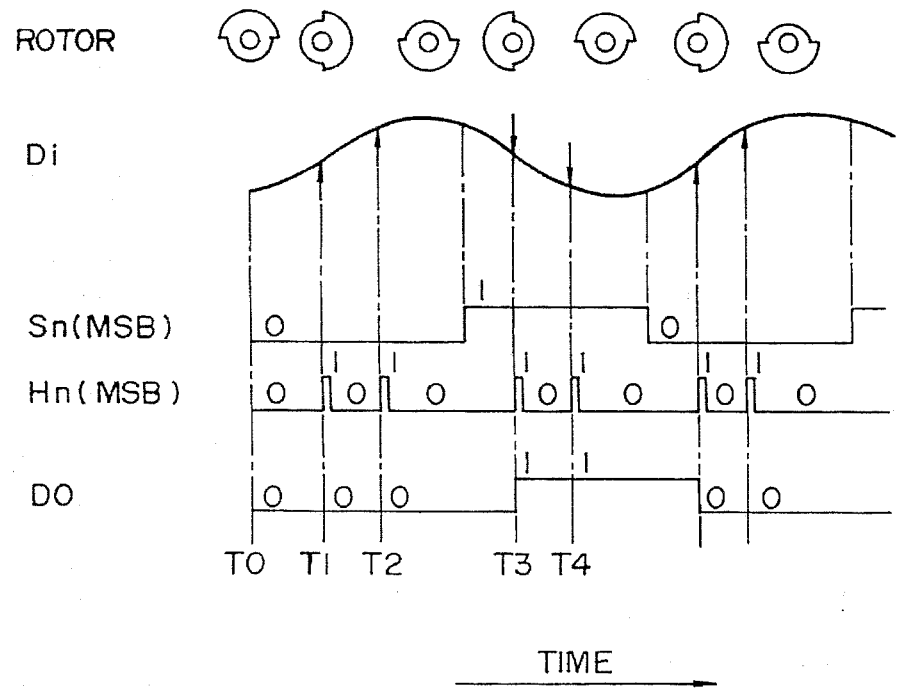

On the other hand, if the groove 10b is located against the pick-up position when the engine is started (hereafter referred to as a start from a recessed portion), the binary output signal DO varies as shown in FIG. 9B. More specifically, at time T0 when the engine is started, the binary output signal DO goes to "0", and at time T1, remains at "0", and at time T3, goes to "1" for the first time. Therefore, in the course of nature, if the groove 10b of the rotor 10 is placed against the pick-up position at time T0 when the engine is started, though the binary output signal DO ought to fall in response to the first passage of an edge portion, but it does not. For this reason, under this arrangement, it is impossible to detect the first falling edge. In order to solve this problem, the at-start pulse generator circuit 55 is provided.

The at-start pulse generator circuit 55 will now be described.

Figure 10:
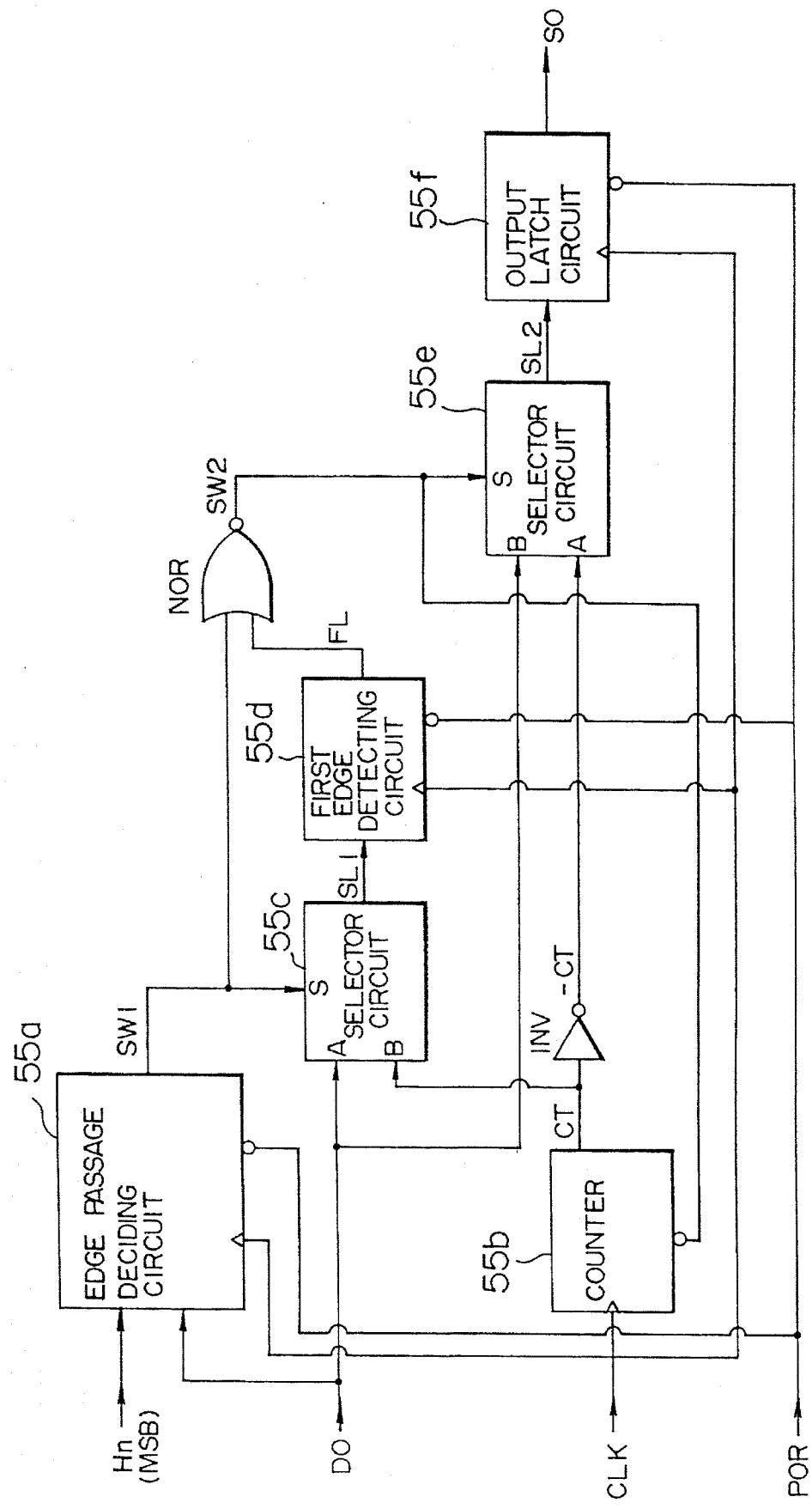
FIG. 10 is a detailed circuit configuration diagram of an at-start pulse generator circuit 55 in the magnetic variation detecting circuit shown in FIG. 2.

The at-start pulse generator circuit 55 has a circuit configuration shown in FIG. 10.

The at-start pulse generator circuit 55 comprises an edge passage deciding circuit 55a for receiving the binary output signal DO and the hysteresis most significant bit signal Hn(MSB) and outputting a first switch signal SW1, a counter 55b for outputting a counter signal CT which goes to the high level after a clock signal CLK is input while the counter is in the set state and the counter counts up to a predetermined count, a first selector circuit 55c for receiving the counter signal CT, the binary output signal DO and a first switch signal SW1 and outputting as a first selection signal SL1 the counter signal SW1 or the binary output signal DO according to a set value of the first switch signal SW1, a first edge detecting circuit 55d for receiving the first selection signal SL1 and outputting a first rising edge decision signal FL which goes to the high level when a first rising edge of the first selection signal SL1 is detected, a NOR circuit for receiving the first rising edge decision signal FL and the first switch signal SW1 and outputting a second switch signal SW2, an inverter INV for receiving a counter signal CT from the counter 55b and outputting an inverted signal –CT, a second selector circuit 55e for receiving the inverted signal –CT and the binary output signal DO and outputting the –CT or DO as a second selection signal SL2 in response to the second switch signal SW2, and an output latch circuit 55f for latching the second selection signal SL2 and outputting this signal as a rotational position signal SO.

A power on reset signal POR is input to the edge passage deciding circuit 55a, the first edge detection circuit 55d and the output latch circuit 55f. When this power on reset signal POR is input, the first switch signal SW1 of the edge passage deciding circuit 55a is set to "1", while the first rising edge decision signal FL of the first edge detection circuit 55d and the SO of the output latch circuit 55f are reset to "0".

The second switch signal SW2 from the NOR circuit is input to the reset terminal of the counter 55b. In other words, the counter 55b is put in the reset hold state while the second switch signal SW2 is at the "0" level.

Description will next be made of the method of setting the first switch signal SW1 in the edge passage deciding circuit 55a.

Figure 11:
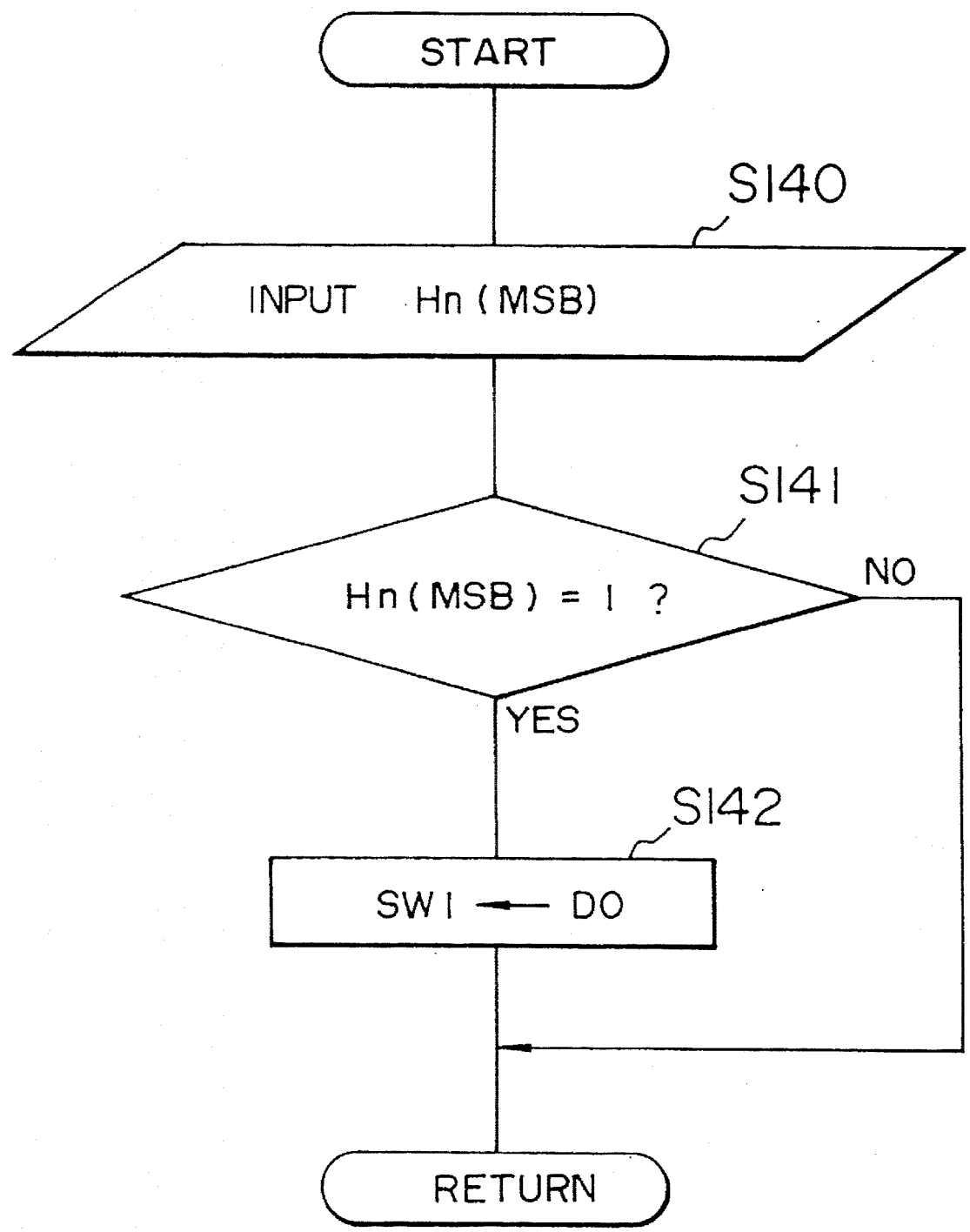
FIG. 11 is a flowchart of an algorithm executed by an edge passage deciding circuit 55a in the at-start pulse generator circuit shown in FIG. 10.

The edge passage deciding circuit 55a has a circuit configuration to execute process steps shown by an algorithm in FIG. 11. To be more specific, a hysteresis most significant bit signal Hn(MSB) is input (S140), and a decision is made whether or not "1" is being input as the signal Hn(MSB). If the decision is "YES", the binary output signal which is being input at this time is set as the first switch signal SW1 (S142). If the decision is "NO", no action is taken and the process is finished.

The conditions for setting the first switch signal SW1 will become clear by description of timing charts corresponding to FIGS. 9A and 9B.

Figure 12A:
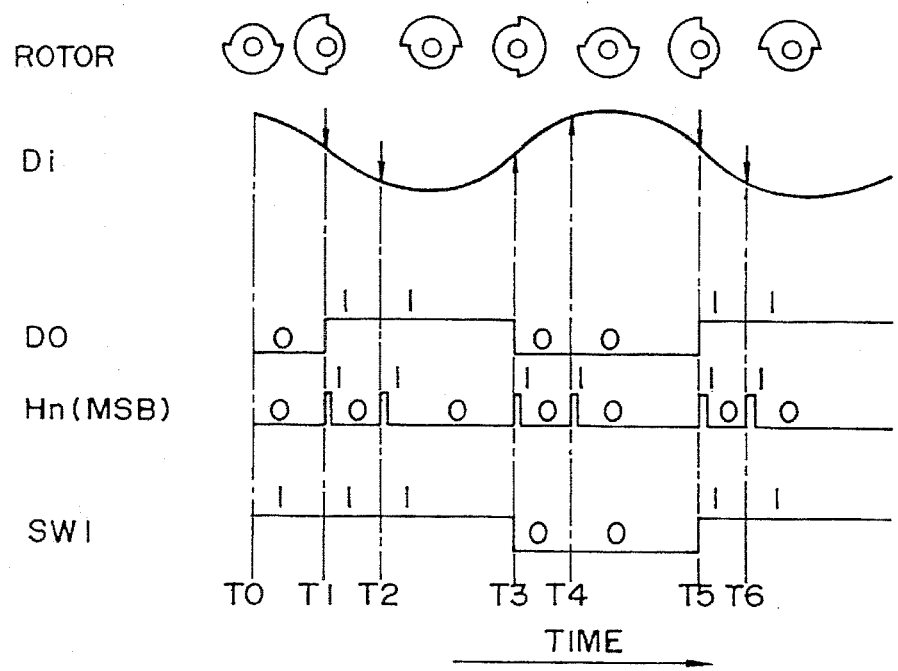
FIGS. 12A and 12B are timing charts showing the relation among signals including the output signal of the edge passage deciding circuit 55a for a predetermined time period from immediately after the engine is started.

FIG. 12A is an example of a start from the projected portion corresponding to FIG. 9A. In this case, the first switch signal SW1 is set to "1" by a power on reset signal POR input at time T0. At this time, as shown in FIG. 9A, the binary output signal DO is set to the initial state of "0". At time T1 when the digital output signal Di increases by a hysteresis width HYS, the hysteresis most significant bit signal Hn(MSB) goes to "1", whereupon the first switch signal SW1 is set again. By this setting again at this time T1, the first switch signal SW1 is again set to the same value of "1" as the binary output signal DO. Consequently, at time T1, in practice the first switch signal only remains at "1". And, the first switch signal SW1 remains at "1" still at time T2, and at time T3, falls to "0" for the first time, then at time T5, bounces back to "1". Hereafter, at every timing that an edge portion between the tooth 10a and the groove 10b of the rotor passes the pick-up position, the first switch signal SW1 changes its level.

Figure 12B:
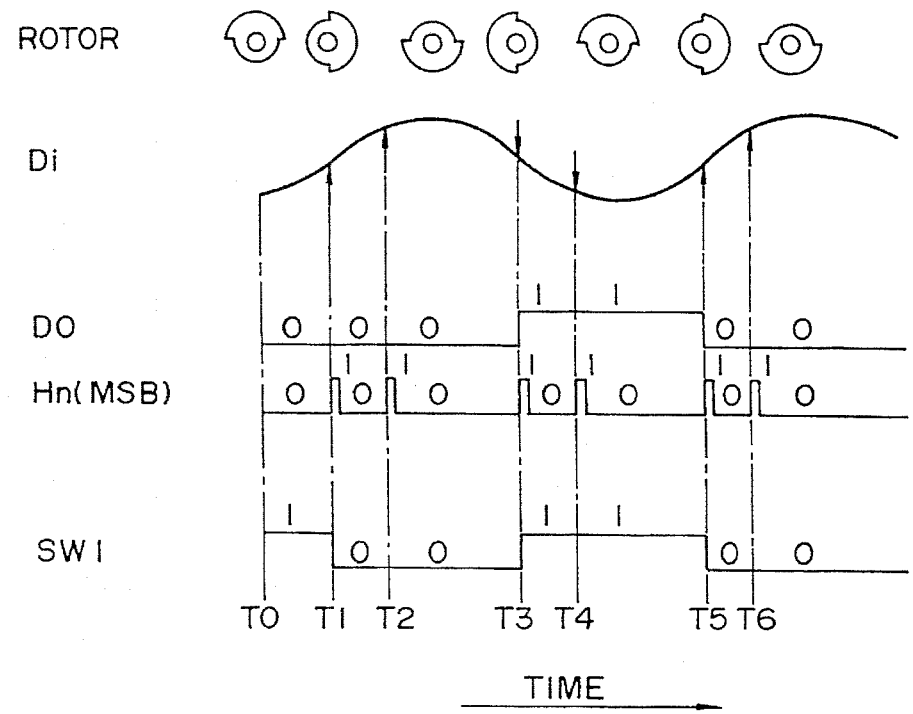

On the other hand, in the case of a start from a recessed portion corresponding to FIG. 9B, as shown in FIG. 12B, at time T0 when the engine is started, the power on reset signal POR is applied to the edge passage deciding circuit 55a, thus pulling the first switch signal SW1 to "1", but at time T1 when the digital output signal Di varies more than the hysteresis width HYS for the first time, the SW1 immediately goes to "0". At time T2, the SW1 remains at "0", and at time T3, rises again to "1", and at time T5, drops to "0". Hereafter, at every timing that an edge portion between the tooth 10a and the groove 10b of the rotor 10 passes the pick-up position, the SW1 changes its level.

Figure 13:
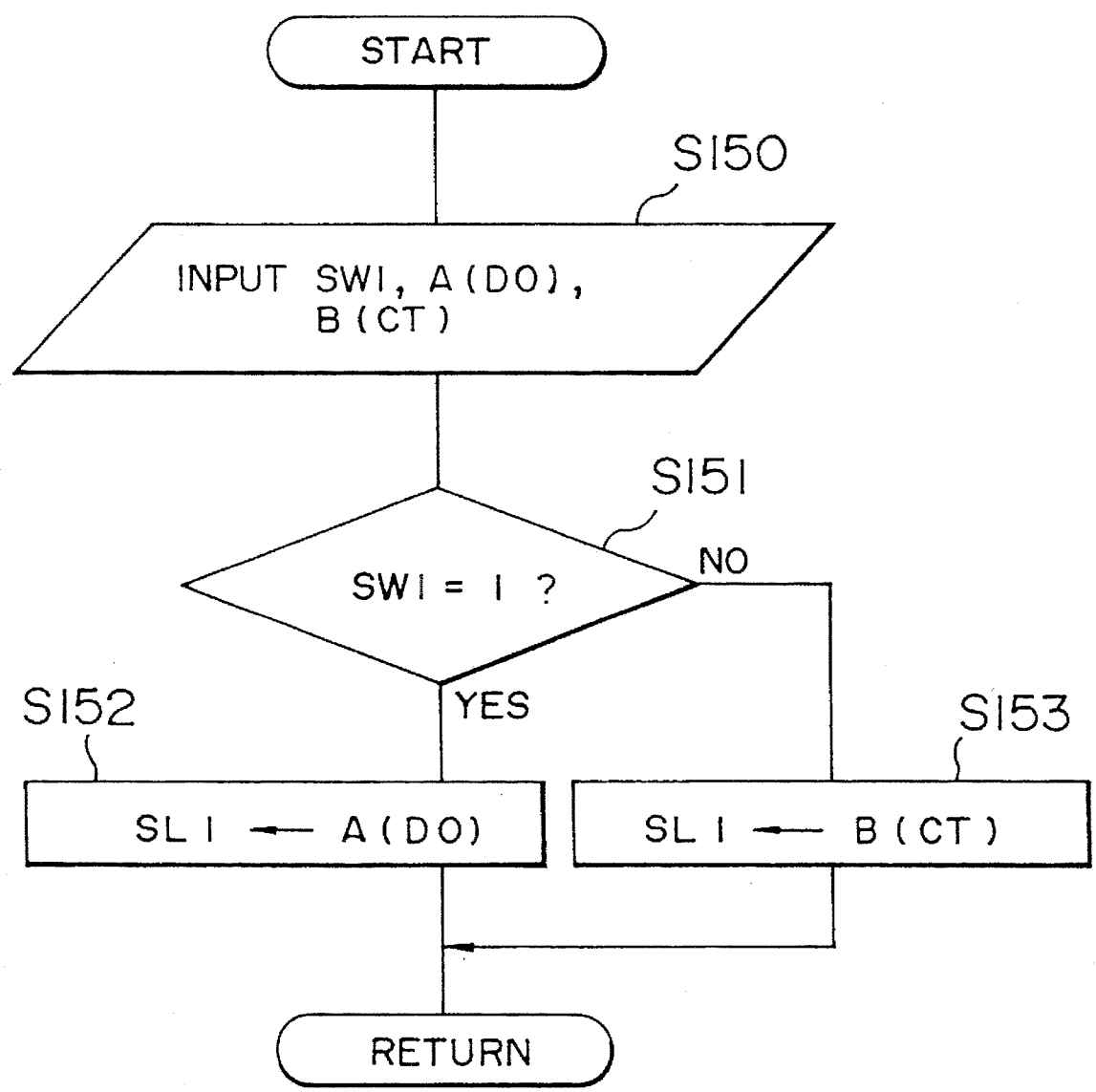
FIG. 13 is a flowchart of an algorithm executed by a first selector circuit 55c in the at-start pulse generator circuit shown in FIG. 10.

Description will next be made of the conditions for signal selection in the first selector circuit 55c to which the first switch signal SW1 has been input. The first selector circuit 55c has a circuit configuration to execute process steps shown in an algorithm in FIG. 13. More specifically, the first switch signal SW1, and the input A(DO) to the A terminal and the input B(CT) to the B terminal are input (S150), a decision is made whether or not the signal SW1 (S151) is "1", if the decision is "YES", the input A(DO) to the A terminal is selected as the first selection signal SL1 (S152), or if the decision is "NO", the input B(CT) to the B terminal is selected as the first selection signal SL1 (S153).

Figure 14A:
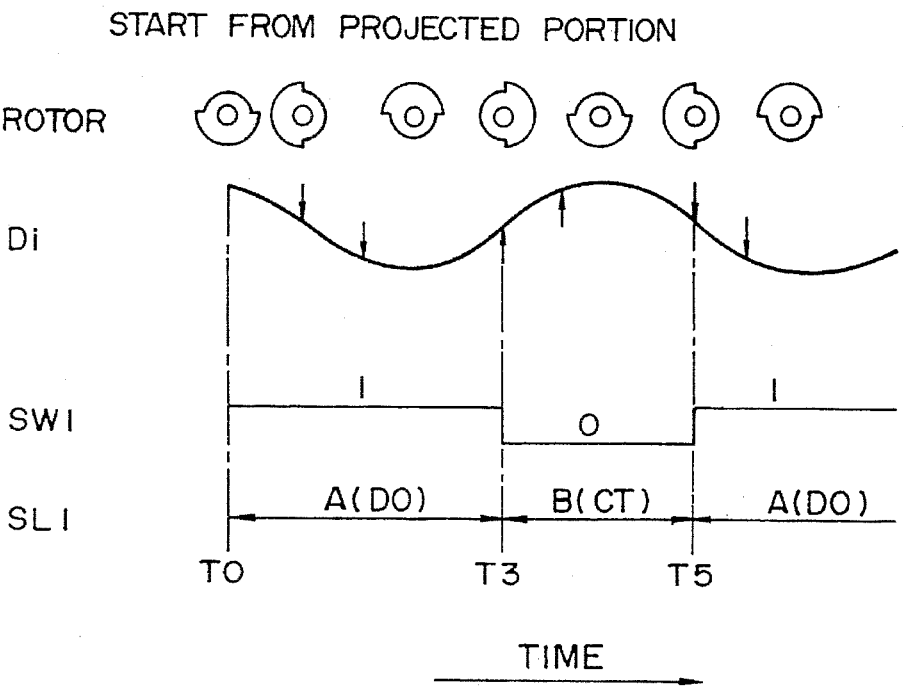
FIGS. 14A and 14B are timing charts showing the relation among signals including a first selection signal SL1 as the output signal of the first selector circuit 55c for a predetermined time period from immediately after the engine is started.
Figure 14B:
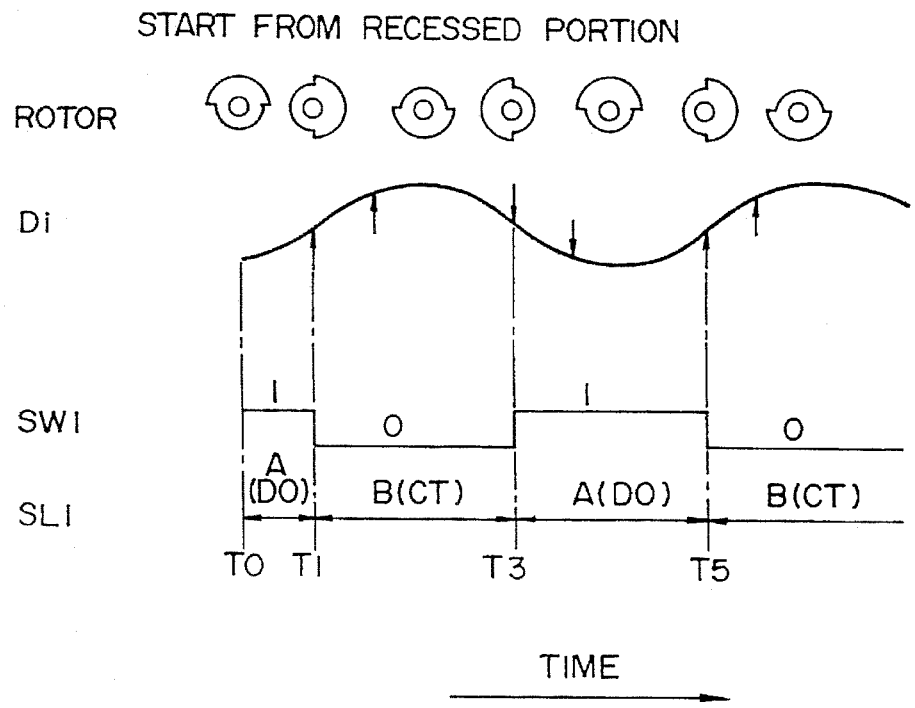

Therefore, in the case of start from the projected portion, as shown in FIG. 14A, from time T0 of engine start till time T3, the input A(DO) to the A terminal is selected as the first selection signal SL1, but from time T3, the input B(CT) to the B terminal is selected. In the case of a start from a recessed portion, as shown in FIG. 14B, at time T0 of engine start, the input to the A terminal is selected, but at time T1, the input to the B terminal is selected as the SL1.

Figure 15:
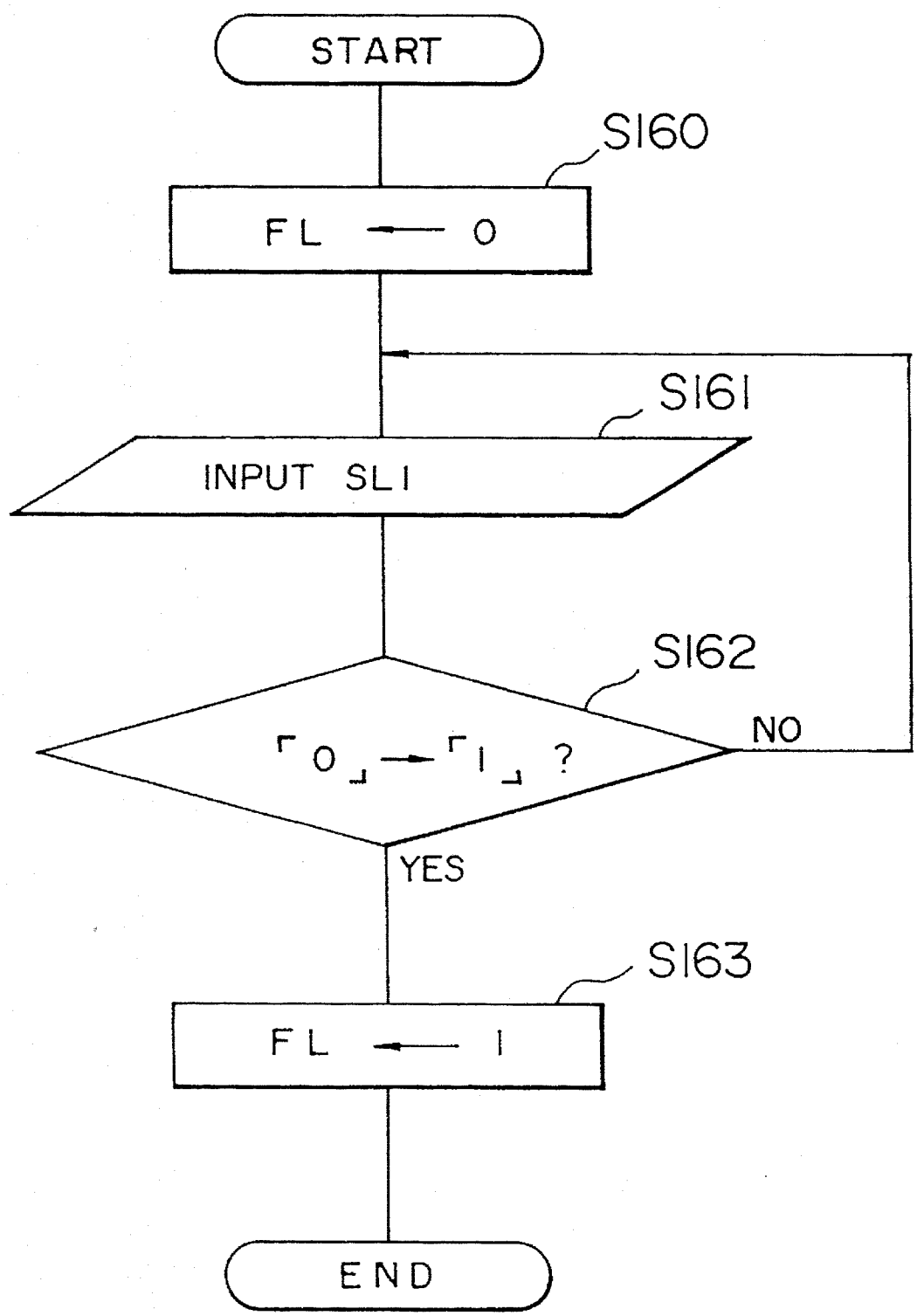
FIG. 15 is a flowchart of an algorithm executed by a first edge detecting circuit 55d in the at-start pulse generator circuit shown in FIG. 10.

The conditions for outputting the FL signal by the first edge detecting circuit 55d to which the thus selected first selection signal SL1 is input are as follows: the first rising edge decision signal FL at the 0 level, set by the power on reset, continues until a first rising edge of the first selection signal SL1 signal is detected, and after the first rising edge is detected, the FL signal stays at the 1 level continuously. To be more specific, as shown in an algorithm in FIG. 15, when the engine is started, the first rising edge decision signal is set to "0" (S160), and after this, a first selection signal SL1 is input (S160), a decision is made whether or not the first selection signal SL1 has changed from "0" to "1" (S162), and if the decision is "NO", the process steps from S151 on are repeated, or if the decision is "YES", the first rising edge decision signal FL is set to "1" (S163) and stays in this state until the engine is stopped (the power is turned off).

Figure 16:
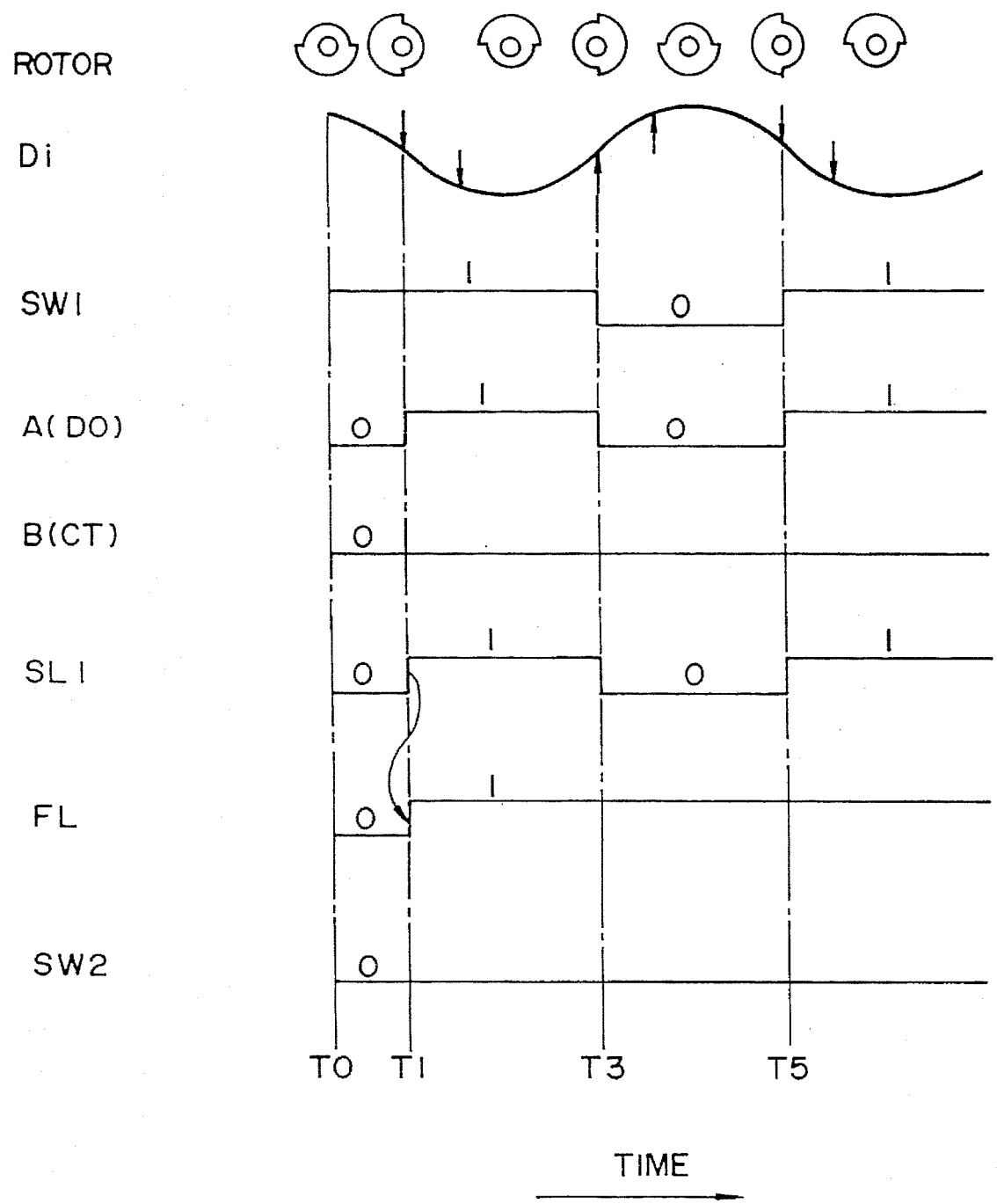
FIG. 16 is a timing chart showing the relation among signals including a second switch signal SW2 as the output signal of NOR gate in the at-start pulse generator circuit shown in FIG. 10 for a predetermined time period from immediately after the engine is started in the case of a start from a projected portion.

Therefore, in the case of starting with a projected portion corresponding to FIG. 12A, the second switch signal SW2 from the NOR circuit progresses as shown in FIG. 16.

At time T0, DO=0, which is the input to the A terminal, is selected as the first selection signal SL1, so that the first rising edge decision signal FL is at the 0 level. The first switch signal SW1 at this time is "1", and therefore, the second switch signal SW2 output from the NOR circuit is "0". At time T1, the SW1 remains in the 1 state. For this reason, at time T1, A(DO)=1 is output as the first selection signal SL1. As a result, the first selection signal SL1 rises from "0" to "1" for the first time. Therefore, at time T1, the first rising edge decision signal FL goes to "1" and hereafter remains at "1". Consequently, two inputs of the NOR circuit never carry 0 signals simultaneously. Therefore, the second switch signal never goes to "1" and remains at "0", thus causing the counter 55b to remain in the reset hold state and leaving the counter signal CT in the 0 state.

Figure 17:
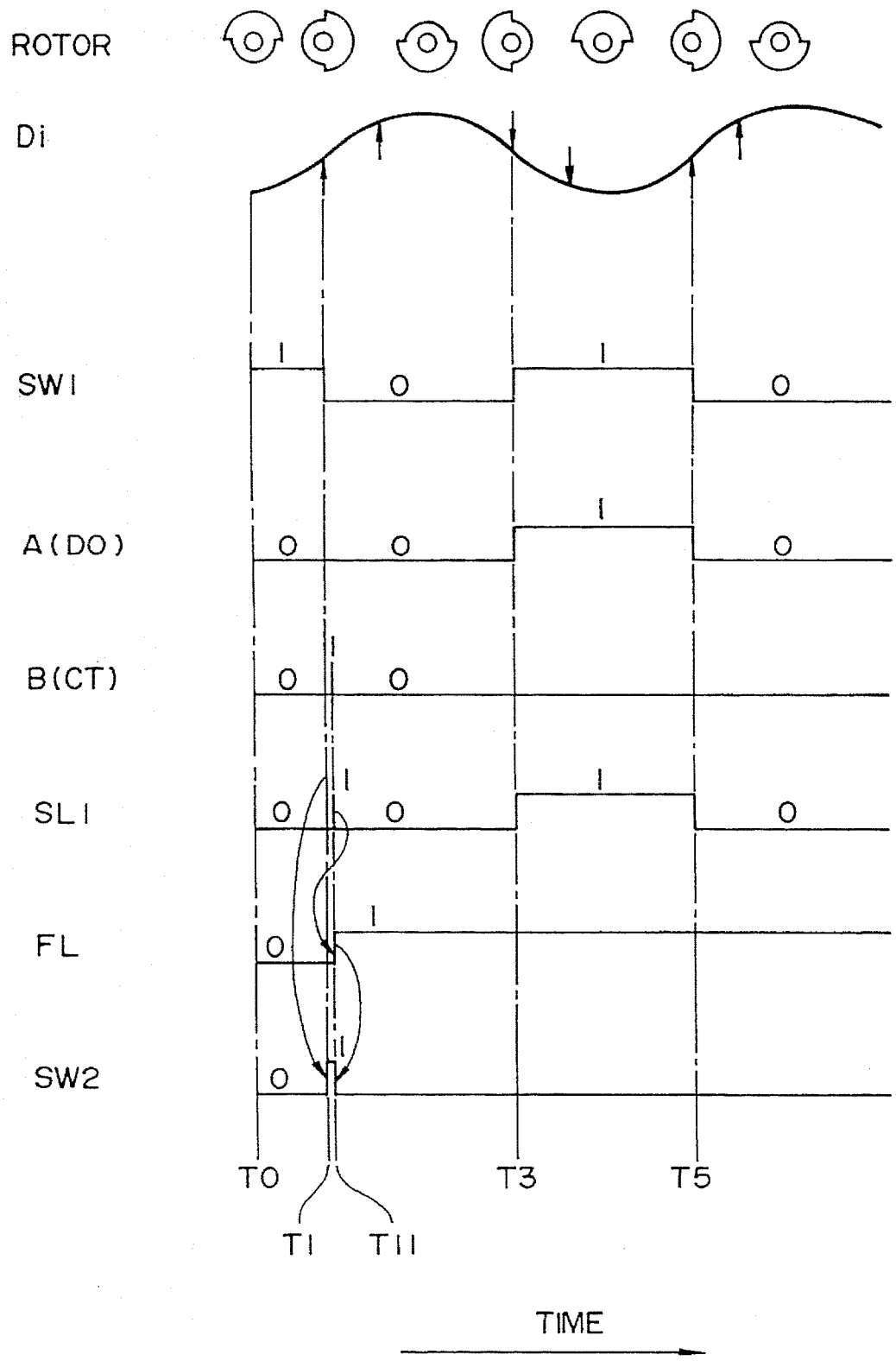
FIG. 17 is a timing chart showing the relation among signals including a second switch signal SW2 for a predetermined time period from immediately after the engine is started in the case of a start from a recessed portion.

On the other hand, in the condition of starting with a recessed portion corresponding to FIG. 12B, the second switch signal SW2 from the NOR circuit varies as shown in FIG. 17.

At time 0, A(DO)=0 as the input to the A terminal is selected as the first selection signal SL1 by the first switch signal SW1=1, causing the first rising edge decision signal to be FL=0, with the result that the second switch signal SW2 goes to "0". Whereupon, the inputs of SW1 and FL are both 0s for the first time, so that the output SW1 of the NOR circuit goes to "1". At time T1, since the SW1 goes to 0, the first selection signal SL1 is switched to the input B(CT) to the B terminal. At this time, the second switch signal SW2=1 is input as the reset releasing signal to the reset terminal of the counter 55b, causing the counter 55b to start counting. At time T11 at which the counter 55b reaches a predetermined count by counting from time T1, the first selection signal SL1 rises from "0" to "1" for the first time. As a result, the first edge detecting circuit 55d executes the process step at S153 mentioned above, and from time T11 onwards the first rising edge decision signal FL is "1". For this reason, the second switch signal SW2 goes to "1" for a short period from time T1 to T11 but is set to "0" for periods other than this short period. Consequently, the counter 55b, after outputting the counter signal CT which goes to the high level once at time T11, stays in the reset hold state.

The conditions for selection by the second selector circuit 55e for this while will be described in the following.

Figure 18:
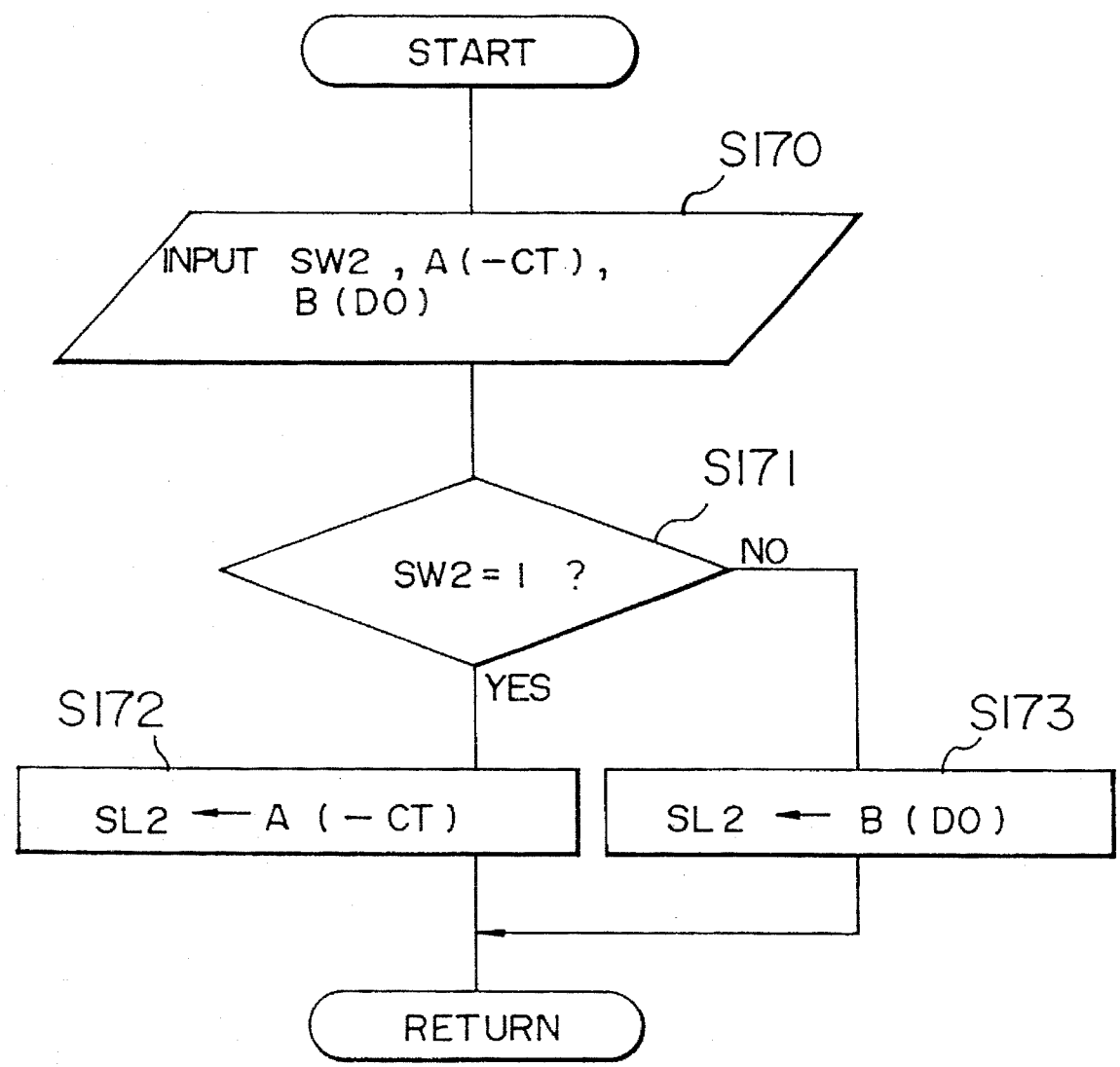
FIG. 18 is a flowchart of an algorithm executed by a second selector circuit 55e in the at-start pulse generator circuit shown in FIG. 10.

The second selector circuit 55e is configured as a circuit for executing the algorithm shown in FIG. 18. Specifically, the second selector circuit 55e receives the second switch signal SW2, and the A-terminal input A(−CT) and the B-terminal input B(DO) (S170), decides whether or not the second switch signal SW2 is "1" (S171), and if the decision is "YES", selects the A-terminal input A(−CT) as the second selection signal SL2 (S172), or if the decision is "NO", selects the B-terminal input B(DO) as the second selection signal SL2 (S173). Then, as shown in FIG. 10, contrary to the case of the first selector circuit 55c, in the second selector circuit 55e, the counter inverted signal −CT inverted by the inverter INV is input to the input on the A terminal side and the binary output signal DO is input to the input on the B terminal side.

Figure 19:
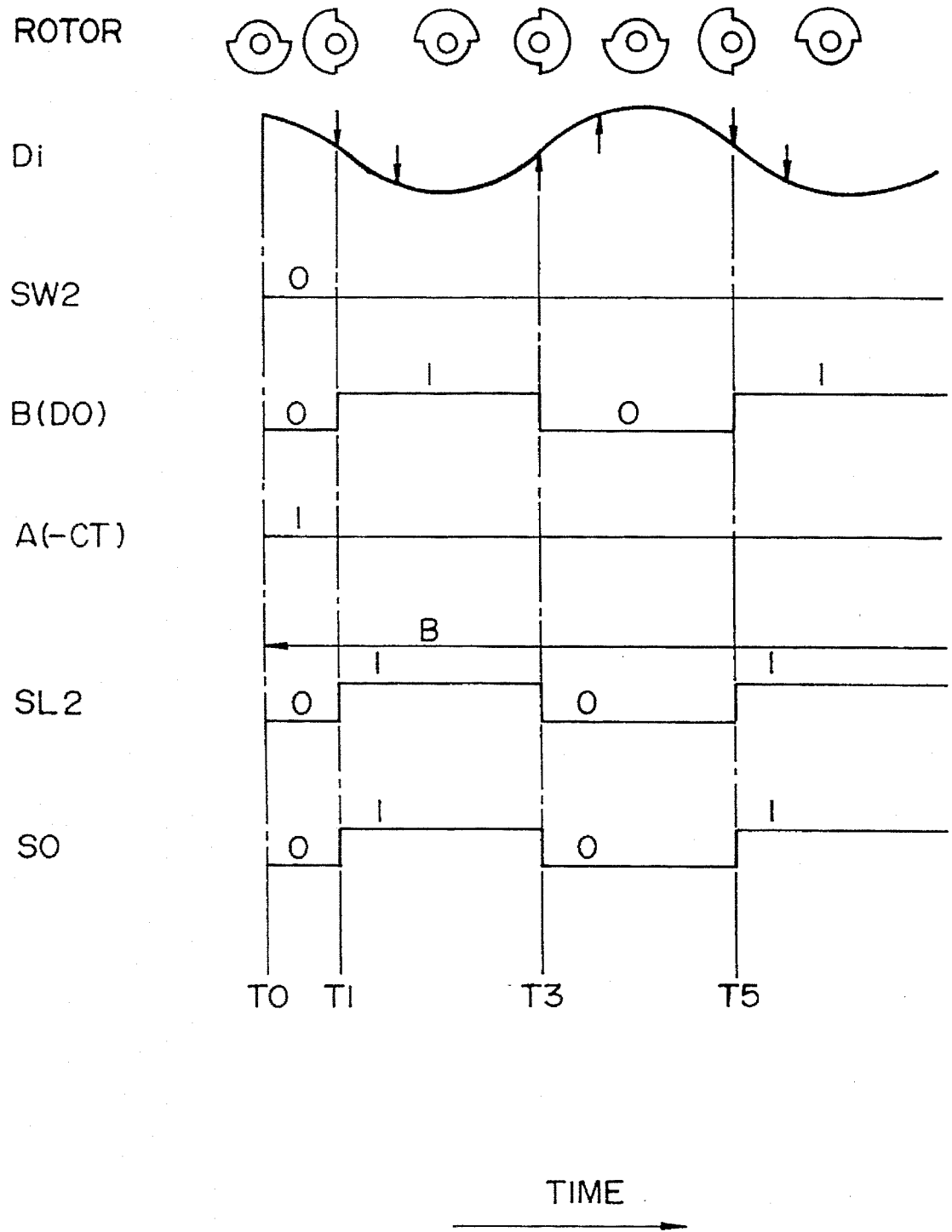
FIG. 19 is a timing chart showing the relation among signals including a second selection signal SL2 as the output of the second selector circuit 55e and a rotational position signal SO as the output of an output latch circuit 55f for a predetermined time period from immediately after the engine is started in the case of a start from a projected portion.
Figure 20:
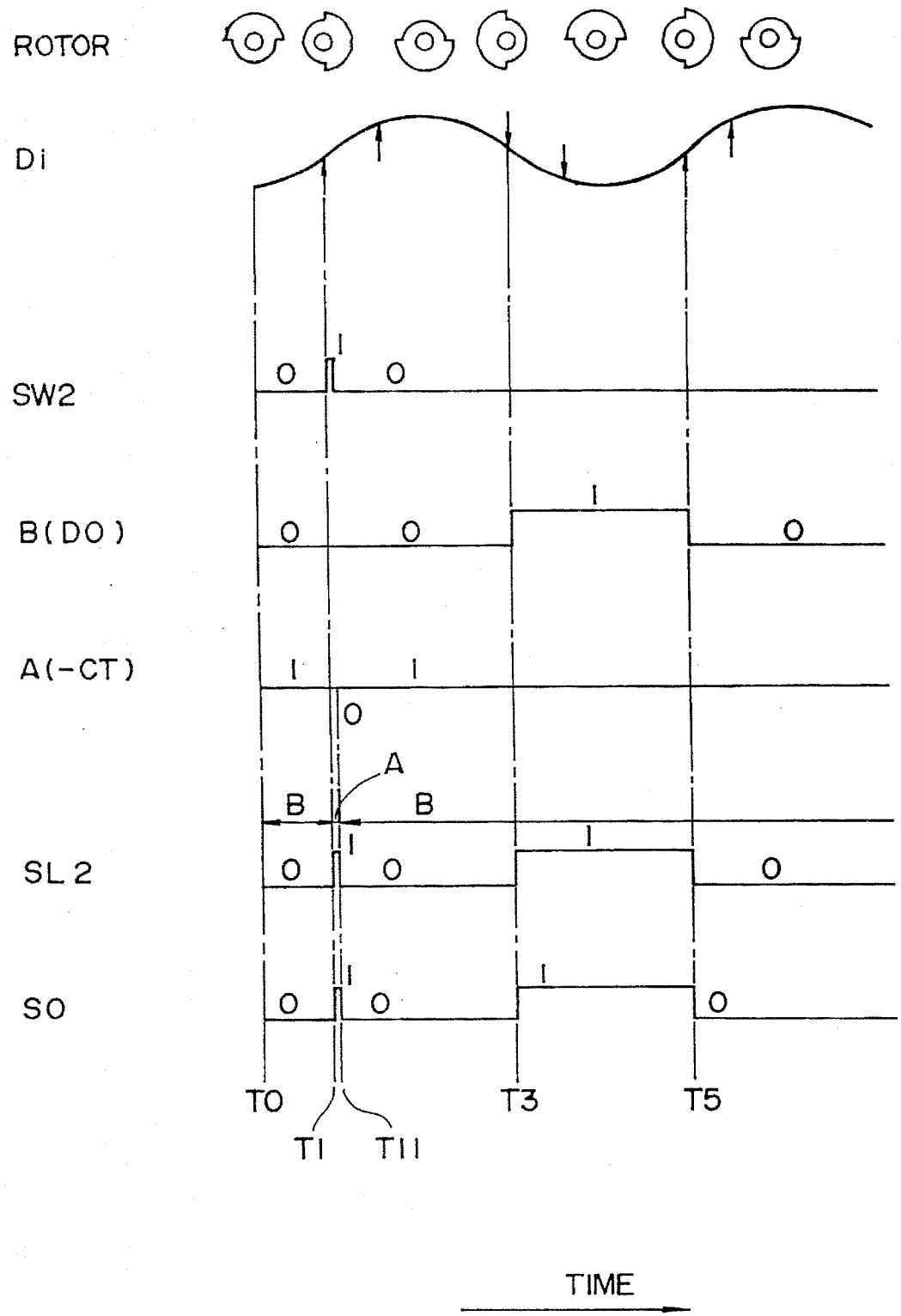
FIG. 20 is a timing chart showing the relation among signals including the second selection signal SL2 and the rotational position signal SO for a predetermined time period from immediately after the engine is started in the case of a start from a recessed portion.

In starting from a projected portion, as shown in FIG. 19, as the second selection signal SL2 from the second selector circuit 55e, input on the B terminal side, in other words, the binary output signal DO is output. On the other hand, in starting with a recessed portion, as shown in FIG. 20, from time T0 to T1, input (DO) on the B terminal side is selected and from time T1 to T11, input (−CT) on the A terminal side is selected. From time T11 onwards, input (DO) on the B terminal side is selected.

Figure 21:
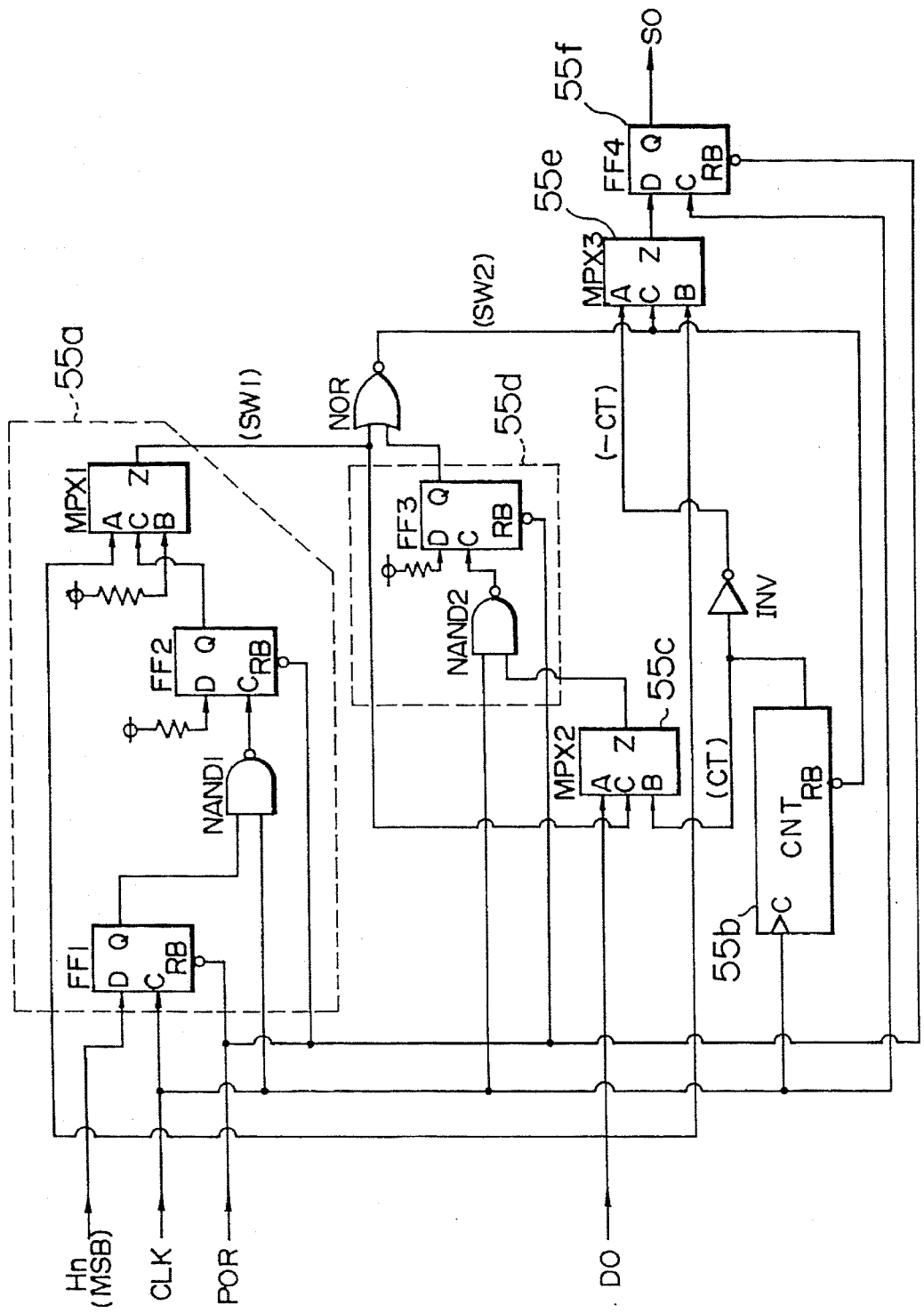
FIG. 21 is a circuit in concrete form of the at-start pulse generator circuit shown in FIG. 10.

FIG. 21 shows this at-start pulse generator 55 in a more practical form. As shown in FIG. 21, the edge passage deciding circuit 55a as a practical example comprises a first D flip-flop FF1 which receives a hysteresis most significant bit signal Hn(MSB) through the D terminal, a circuit NAND1 which receives output of the Q terminal of the first D flip-flop FF1 and a clock signal CLK, a second D flip-flop FF2 which operates by receiving an output signal of the NAND 1, and a multi-plexer MPX1.

The first edge detecting circuit 55d as a practical example comprises a NAND2 and a D flip-flop FF3. The first selector circuit 55c and the second selector circuit 55e are respectively formed by multiplexers MPX2 and MPX3. The counter 55b is formed by a counter CNT, and the output latch circuit 55f is formed by a D flip-flop FF4.

The operation of the whole cylinder discriminating sensor in this embodiment as represented in an algorithm proceeds as follows.

Figure 22:
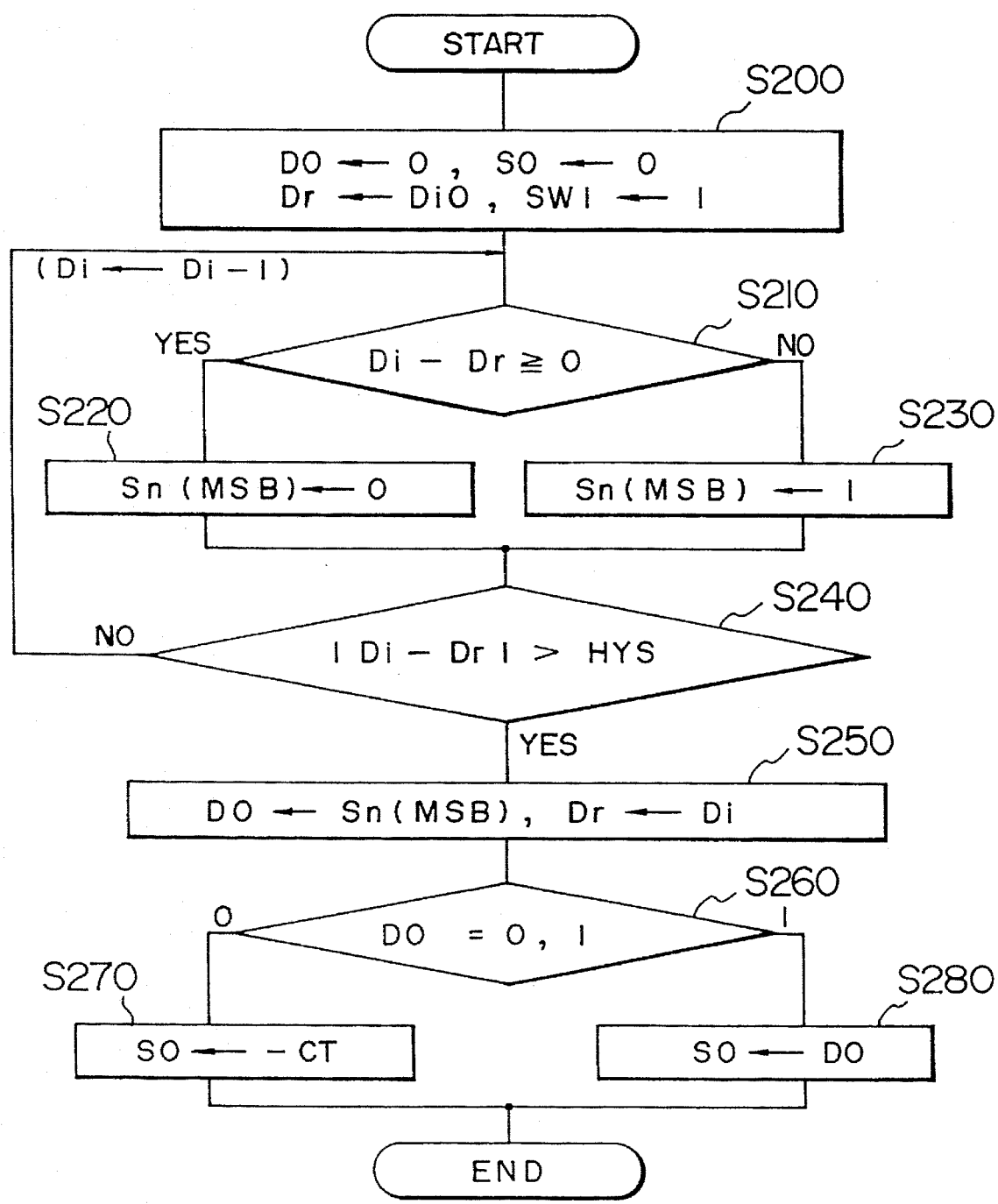
FIG. 22 is a flowchart showing the operation algorithm, intended for use at starting, of the cylinder discriminating sensor as the embodiment of the present invention.

When the engine is started, as shown in FIG. 22, the cylinder discriminating sensor is initialized by a power on reset signal POR (S200). To be more specific, as described above, the binary output signal DO and the rotational position signal SO are set to "0", the first switch signal SW1 is set to "1", and the reference value signal Dr is set to the initial detection value.

Next, in the process in the comparator 53, a decision is made whether or not the difference Sn=Di−Dr is equal to or larger than 0 (S210), and when the difference Sn corresponds to an increasing trend, the difference most significant bit signal Sn(MSB) is set to "0" (S220), or if the difference Sn corresponds to a decreasing trend, the difference most significant bit signal Sn(MSB) is set to "1" (S230). Then, a comparison is made to see if the absolute value of the difference Sn is larger than the hysteresis width HYS (S240), and only when |Di−Dr|>HYS, the process proceeds to the next step.

In the next process step, the binary output signal DO and the reference value signal Dr are set again (S250). To be more specific, for the binary output signal DO, the difference most significant bit signal Sn(MSB) at this time is set, and as the reference value signal Dr, Di at this time is set. A decision is made whether or not the signal is inverted in the first setting again of this binary output signal DO (S260). If not, in other words, if the decision at S260 is "DO=0", as the rotational position signal SO, a counter inverted signal −CT in the form of a short artificial pulse is output (S270), and if the signal is inverted, in other words, if the decision at S260 is "DO=1", as the rotational position signal SO, the binary output signal DO is output as is (S280). Note that when the rotor 10 actually rotates by starting from a projected portion, the step at S270 is not performed, or when the rotor 10 rotates by starting with a recessed portion, the step of S270 is performed only once.

Figure 23:
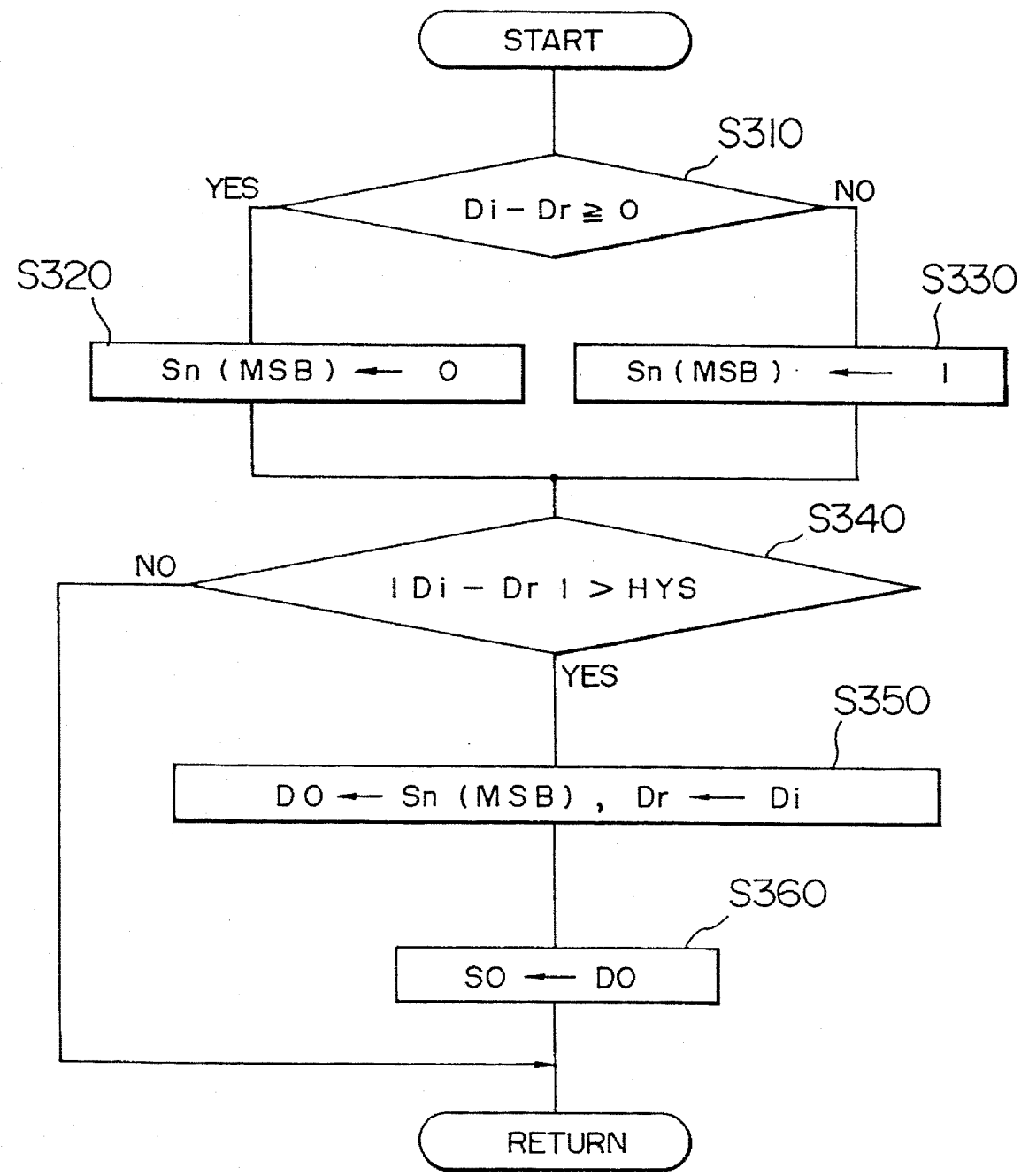
FIG. 23 is a flowchart showing the operation algorithm, intended for use during a normal operation, of the cylinder discriminating sensor as the embodiment of the present invention.

After the engine is started and the above-mentioned process at starting is finished, as shown in FIG. 23, a decision is made whether or not the difference Sn=Di–Dr is equal to or larger than 0 (S310), and if the difference corresponds to an increasing trend, the difference most significant bit signal Sn(MSB) is set to "0" (S320) or if the difference corresponds to a decreasing trend, the difference most significant bit signal Sn(MSB) is set to "1" (S330). Then, a comparison is made to see if the absolute value of the difference signal Sn=Di–Dr is larger than the hysteresis width HYS (S340), and only when |Di–Dr|>HYS, the process proceeds to the following steps.

In the next step, the binary output signal DO and the reference value signal Dr are set again (S350). The steps from S310 to S340 are exactly the same as the steps from S210 to S240. After this, in contrast to the steps S260 to S280, in this process, the binary output signal DO is invariably output as the rotational position signal SO (S360).

An example of the cylinder discriminating sensor 1 in this embodiment applied to the ignition timing control unit will be described.

Figure 24:
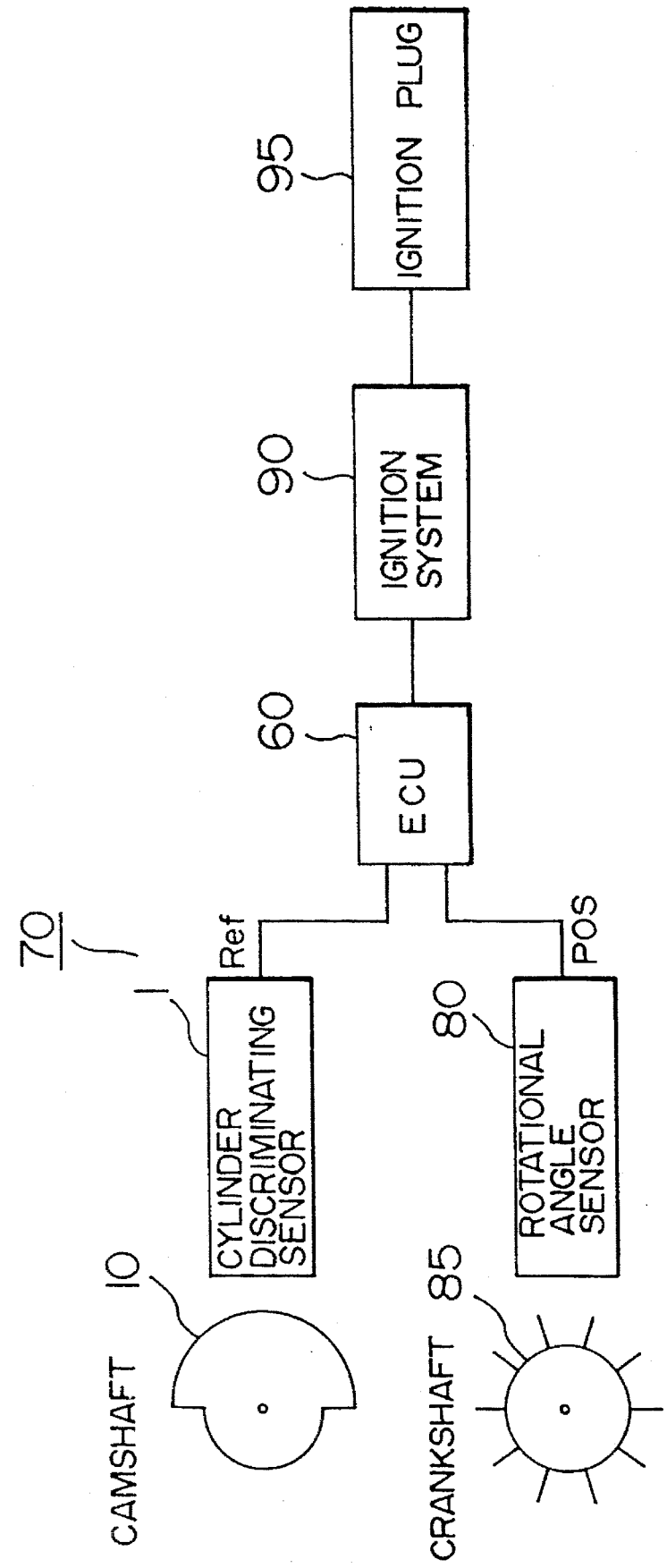
FIG. 24 is a construction diagram when the cylinder discriminating sensor as the embodiment of the present invention is used in the ignition timing control unit.

An ignition timing control unit 70 in this application is shown in FIG. 24 and comprises a cylinder discriminating sensor 1 constituted chiefly by the above-mentioned magnetic variation detecting circuit 50, and a rotational angle sensor 80 similar in construction to the magnetic variation detecting sensor 50. It ought to be noted that the rotor 10 for cylinder discrimination as an object of detection by the cylinder discriminating sensor 1 is mounted to the camshaft, and has a tooth formed around its semicircular portion and a groove formed around its remaining semicircular portion. A rotor 85 for rotational angle determination has many teeth and grooves and is mounted to the crankshaft.

A cylinder discrimination signal Ref (SO mentioned above) from the cylinder discriminating sensor 1 and a rotational angle signal POS from the rotational angle sensor 80 are input to ECU 60. ECU 60 executes arithmetic processes, and calculates ignition timing as well as an injection quantity. ECU 60 outputs a signal directing ignition by the ignition system 90 at timing based on the cylinder discriminating signal Ref and the rotational angle signal POS, and a spark is produced by an ignition plug 95 in an engine cylinder.

Figure 25A:
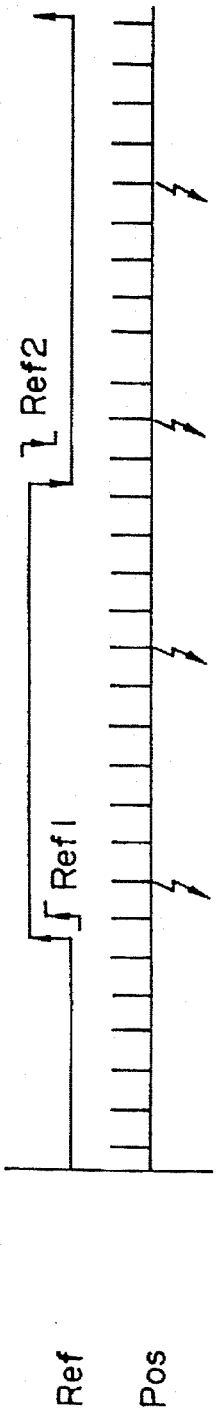
FIGS. 25A, 25B and 25C are timing charts showing the way of ignition timing control by the ignition timing control unit in FIG. 24, compared with that of the conventional device.

In this process in this embodiment, as described earlier, the cylinder discriminating signal Ref is set forcedly in the state of starting with a projected portion when the engine is started. Therefore, when a start from a projected portion is executed in compliance with the setting, as shown in FIG. 25A, an ignition directive is issued to the fourth and the second cylinders in that order according to the first cylinder discriminating signal Ref1. In response to the next cylinder discriminating signal Ref2, an ignition directive is issued to the first and the third cylinders in that order.

Figure 25B:
Figure 25C:
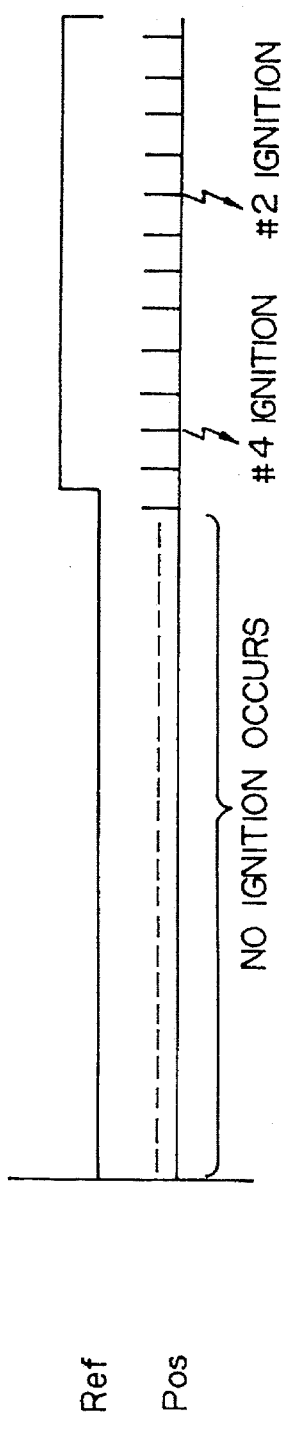
Figure 26:
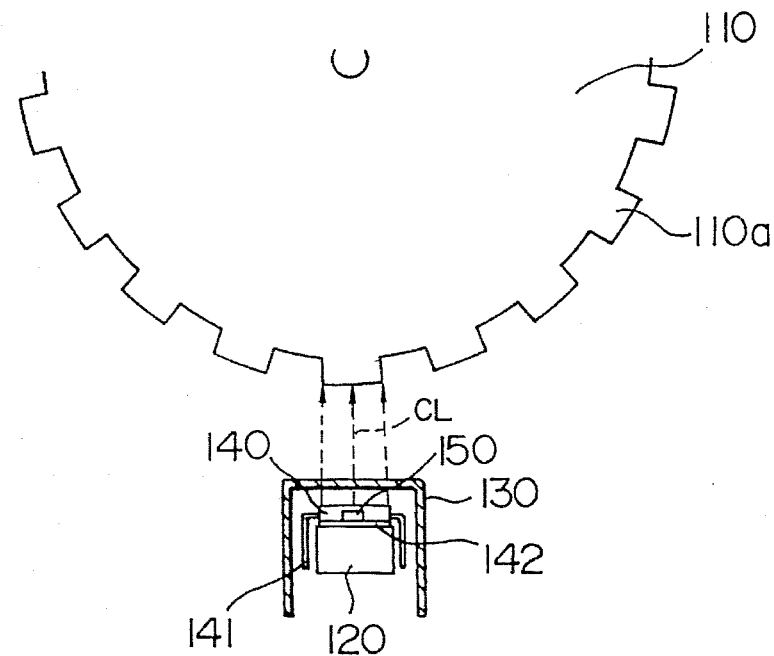
FIG. 26 is a schematic construction diagram of the conventional rotational position detecting apparatus.
Figure 28:
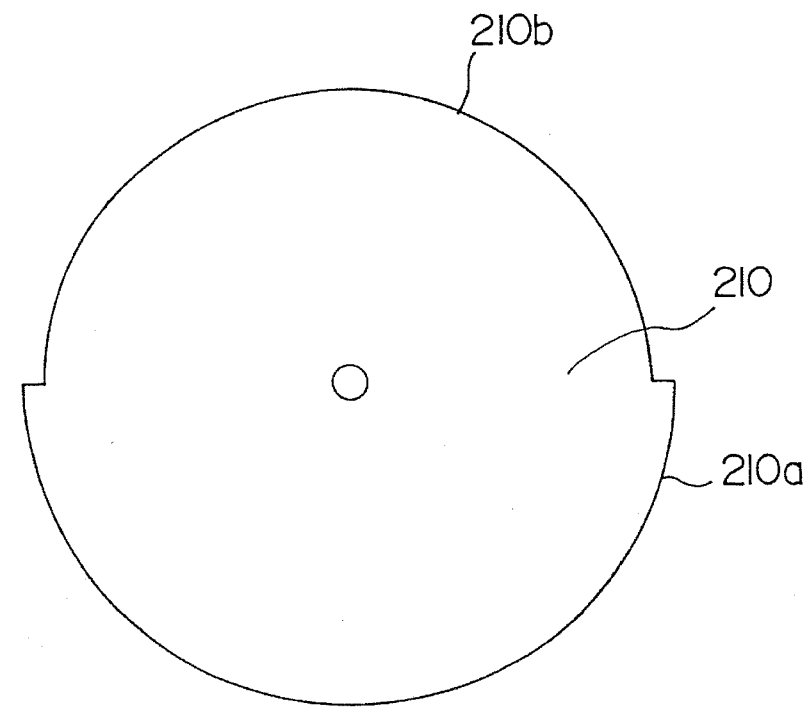
FIG. 28 is a schematic construction diagram of a rotor when the prior art is used in the cylinder discriminating sensor.
Figure 27:
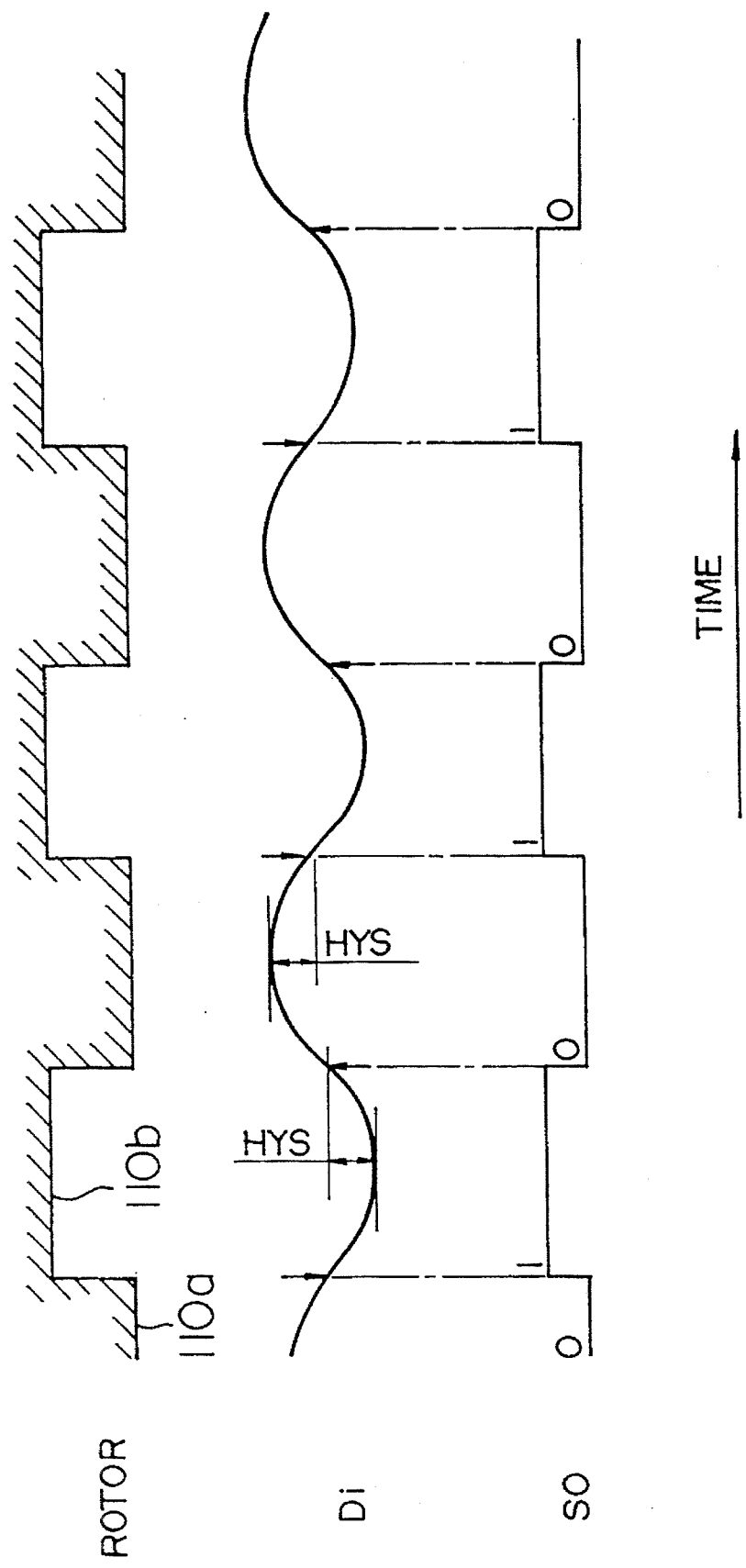
FIG. 27 is a timing chart illustrating the changing condition of the rotational position signal SO in an ordinary rotational position detecting sensor.

On the other hand, if a start from a recessed portion takes place despite the initial setting of a start from a projected portion, ignition occurs in the order shown in FIG. 25B. FIG. 25C shows a start from a recessed portion in the conventional apparatus for a comparison with the case shown in FIG. 25B.

Description will first be made of the case in the conventional apparatus. In the conventional apparatus, when an actual form of start differs from the initial setting of start, it is impossible to detect a first falling edge. As a result, an ignition directive cannot be issued to the first and the third cylinders for an instant immediately after the engine start. In contrast, when the cylinder discriminating sensor 1 in this embodiment is used, an artificial pulse PLS based on a counter inverted signal –CT gives the first cylinder discriminating signal Ref1', so that ignition can take place in the first and the third cylinders from the beginning without fail.

In other words, the cylinder discriminating sensor 1 in this embodiment enables ignition to take place from the early stage, reducing chances of unburnt gas being exhausted to the atmospheric air immediately after the engine is started, so that an improved startability of the engine can be obtained.

An embodiment of the present invention has been described. The present invention is not limited, but many widely different embodiments of the present invention may be adopted without departing from the spirit and scope of the present invention.

For example, the present invention can be applied to the rotational position sensor other than the cylinder discriminating sensor, and needless to say, can be applied to various apparatuses other than the ignition timing control unit. The above-mentioned cylinder discriminating sensor may be arranged so that the rotational position signal SO starts from a high level when the magnetic variation detecting circuit is in the power on reset state.

As discussed in the detailed description, by using the apparatus for detecting the rotational position of the rotor of the present invention, the rotational position can be detected from immediately after the rotor starts to rotate.

We claim:

1. Apparatus for detecting a rotational position of a rotor, comprising:

a rotor having a tooth to be detected;

pick-up means, disposed in a vicinity of said rotor, for generating a rotation detection signal which indicates a proximity of a rotational position of said tooth with respect to said pick-up means;

change-over timing detecting means for detecting timing for said tooth to rotate between a first state in which said tooth is proximate to said pick-up means and a second state in which said tooth is not proximate to said pick-up means, on a basis of a variation of said rotation detection signal;

pulse signal outputting means for outputting a pulse signal which changes cyclically between a first level corresponding to said first state and a second level corresponding to said second state in accordance with a detection result of said change-over timing detecting means;

rotational position detecting means for detecting a rotational position of said rotor in accordance with said pulse signal;

compulsory setting means for compulsorily setting said pulse signal to an initial value of a predetermined one of said first level and said second level when said rotor starts to rotate from a stationary state;

determining means for determining whether or not said initial value of said pulse signal set compulsorily has been inverted in response to a first change-over timing detection made by said change-over timing detecting means; and artificial change-over signal outputting means for outputting an artificial change-over signal artificially representing a change-over timing to said rotational position detecting means in response to said first change-over timing detection when said determining means determines that said initial value of said pulse signal set compulsorily has not been inverted.

2. Apparatus for detecting a rotational position of a rotor according to claim 1, wherein said pick-up means includes magnetic variation detecting means using a Hall element.

3. Apparatus for detecting a rotational position of a rotor according to claim 2, wherein said change-over timing detecting means comprises:

two voltage controlled oscillators respectively controlled by two Hall voltages output from said Hall element; and means for obtaining a difference between frequencies output by said two voltage controlled oscillators.

4. Apparatus for detecting a rotational position of a rotor according to claim 1, further comprising means for converting said rotation detection signal into a digital output signal.

5. Apparatus for detecting a rotational position of a rotor according to claim 1, wherein said rotor has one only tooth.

6. Apparatus for detecting a rotational position of a rotor, comprising:

a rotor having a tooth to be detected;

pick-up means, disposed in a vicinity of said rotor, for generating a rotation detection signal which indicates a proximity of a rotational position of said tooth with respect to said pick-up means;

change-over timing detecting means for detecting timing for said tooth to rotate between a first state in which said tooth is proximate to said pick-up means and a second state in which said tooth is not proximate to said pick-up means, on a basis of a variation of said rotation detection signal;

pulse signal outputting means for outputting a pulse signal which changes cyclically between a first level corresponding to said first state and a second level corresponding to said second state in accordance with a detection result of said change-over timing detecting means;

rotational position detecting means for detecting a rotational position of said rotor in accordance with said pulse signal;

compulsory setting means for compulsorily setting said pulse signal to an initial value of a predetermined one of said first level and said second level when said rotor starts to rotate from a stationary state;

determining means for determining whether or not said initial value of said pulse signal set compulsorily has been inverted in response to a first change-over timing detection made by said change-over timing detecting means;

artificial change-over signal outputting means for outputting an artificial change-over signal artificially representing a change-over timing to said rotational position detecting means in response to said first change-over timing detection when said determining means determines that said initial value of said pulse signal set compulsorily has not been inverted; and means for converting said rotation detection signal into a digital output signal;

said change-over timing detecting means comprising:

a reference value rewriting decision and latch circuit for generating a reference value signal by providing non-linear hysteresis characteristics having a predetermined hysteresis width to a value represented by said digital output signal, a difference detecting circuit for obtaining a difference signal between said reference value signal and said digital output signal which are input to said difference detecting circuit, said difference signal having a most significant bit for which "1" or "0" is set depending on whether or not said difference signal is larger than 0, a hysteresis arithmetic circuit for obtaining a hysteresis signal given by subtracting said hysteresis width from an absolute value of said difference signal, said hysteresis signal having a most significant bit for which "1" or "0" is set depending on whether or not said hysteresis signal is larger than 0, and for outputting the most significant bit of said hysteresis signal, and an output latch circuit for outputting a binary output signal, an initial value of said output latch circuit being fixed to a predetermined one of "1" or "0" in accordance with said most significant bit of said hysteresis signal and said most significant bit of said difference signal, said binary output signal being determined by a rotational phase of said rotor after at least a half rotation thereof.

7. Apparatus for detecting a rotational position of a rotor according to claim 6, wherein said determining means determines whether or not said initial value of said pulse signal set compulsorily has been inverted according to said binary output signal and said most significant bit of said hysteresis signal.

8. Apparatus for detecting a rotational position of a rotor, comprising:

a rotor having a protruding tooth;

pick-up means, disposed in a vicinity of said rotor, for generating a rotation detection signal which indicates a rotational position of said tooth with respect to a proximity of said tooth to said pick-up means;

change-over timing detecting means for detecting timing for said tooth to rotate between a first state in which said tooth is proximate to said pick-up means and a second state in which said tooth is not proximate to said pick-up means, on a basis of a variation of said rotation detection signal;

pulse signal outputting means for outputting a pulse signal which changes cyclically between a first level corresponding to said first state and a second level corresponding to said second state in accordance with a detection result of said change-over timing detecting means;

compulsory setting means for compulsorily setting said pulse signal to an initial value of one of said first level and said second level when said rotor starts to rotate from a stationary state in contravention to said actual rotational position of said rotor.

9. Apparatus for detecting a rotational position of a rotor according to claim 8, wherein said pick-up means includes magnetic variation detecting means using a Hall element.

10. Apparatus for detecting a rotational position of a rotor according to claim 9, wherein said change-over timing detecting means comprises voltage controlled oscillator means controlled by an output from said Hall element.

11. Apparatus for detecting a rotational position of a rotor according to claim 8, further comprising means for converting said rotation detection signal into a digital output signal.

12. Apparatus for detecting a rotational position of a rotor according to claim 11, wherein said change-over timing detecting means comprises:

a reference value rewriting decision and latch circuit for generating a reference value signal by providing hysteresis characteristics having a predetermined hysteresis width to a value represented by said digital output signal.

13. Apparatus for detecting a rotational position of a rotor according to claim 12, wherein said change-over timing detecting means further comprises:

a difference detecting circuit for obtaining a difference signal between said reference value signal and said digital output signal which are input to said difference detecting circuit, said difference signal having a most significant bit for which "1" or "0" is set depending on whether or not said difference signal is larger than 0.

14. Apparatus for detecting a rotational position of a rotor according to claim 13, wherein said changeover timing detecting means further comprises:

a hysteresis arithmetic circuit for obtaining a hysteresis signal given by subtracting said hysteresis width from an absolute value of said difference signal, said hysteresis signal having a most significant bit for which "1" or "0" is set depending on whether or not said hysteresis signal is larger than 0, and for outputting said most significant bit of said hysteresis signal.

15. Apparatus for detecting a rotational position of a rotor according to claim 14, wherein said changeover timing detecting means further comprises:

an output latch circuit for outputting a binary output signal, an initial value of said output latch circuit being fixed to a predetermined one of "1" or "0" in accordance with said most significant bit of said hysteresis signal and said most significant bit of said difference signal.

16. Apparatus for detecting a rotational position of a rotor according to claim 15, wherein said apparatus further comprises:

determining means for determining whether or not said initial value of said pulse signal set compulsorily has been inverted in response to a first change-over timing detection made by said change-over timing detecting means according to said binary output signal and said most significant bit of said hysteresis signal.

17. Apparatus for detecting a rotational position of a rotor according to claim 8, wherein said apparatus further comprises:

artificial change-over signal outputting means for artificially setting said pulse signal to one of said first level and said second level when said rotor starts to rotate from a stationary state in contravention to said rotational position of said rotor.

* * * * *